United States Patent
Eguchi

(10) Patent No.: US 8,830,358 B2
(45) Date of Patent: Sep. 9, 2014

(54) HIGH ZOOM-RATIO ZOOM LENS SYSTEM AND ELECTRONIC IMAGING APPARATUS USING THE SAME

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 422 days.

(21) Appl. No.: 13/223,612

(22) Filed: Sep. 1, 2011

(65) Prior Publication Data
US 2012/0062770 A1    Mar. 15, 2012

(30) Foreign Application Priority Data
Sep. 14, 2010 (JP) ................................. 2010-205962

(51) Int. Cl.
*H04N 5/262* (2006.01)
*G02B 15/173* (2006.01)

(52) U.S. Cl.
CPC .................................. *G02B 15/173* (2013.01)
USPC ......... 348/240.3; 348/335; 359/687; 359/774

(58) Field of Classification Search
USPC ........................ 348/240.3, 335; 359/687, 774
See application file for complete search history.

(56) References Cited

U.S. PATENT DOCUMENTS

| | | |
|---|---|---|
| 2005/0243437 A1 | 11/2005 | Hozumi et al. |
| 2006/0262422 A1 | 11/2006 | Ohashi |
| 2008/0100923 A1 | 5/2008 | Morooka |
| 2009/0310226 A1 * | 12/2009 | Sato ............................. 359/676 |

FOREIGN PATENT DOCUMENTS

| | | |
|---|---|---|
| JP | 2006-23529 | 1/2006 |
| JP | 2006-308957 | 11/2006 |
| JP | 2008-112013 | 5/2008 |

OTHER PUBLICATIONS

U.S. Appl. No. 13/214,450 to Masaru Eguchi, filed Aug. 22, 2011.

* cited by examiner

*Primary Examiner* — Paul Berardesca
(74) *Attorney, Agent, or Firm* — Greenblum & Bernstein, P.L.C.

(57) ABSTRACT

A high zoom-ratio zoom lens system includes a positive first lens group, a negative second lens group, a positive third lens group and a positive fourth lens group. Upon zooming, the distance between the first and second lens groups increases, the distance between the second and third lens groups decreases, and the distance between the third and fourth lens groups increases. The first lens group includes a negative lens element, and two positive lens elements. The absolute value of the radius-of-curvature of the image-side surface of the negative lens element within the first lens group is smaller than the absolute value of the radius-of-curvature of the object-side surface of the positive lens element on the object side within the first lens group. The following condition (1) is satisfied:

$$1.95 < n11 \qquad (1),$$

wherein $n11$ designates the refractive index at the d-line of the negative lens element within the first lens group.

5 Claims, 32 Drawing Sheets

FNO.=1:6.0

−0.2   0.2
SPHERICAL
ABERRATION
CHROMATIC
ABERRATION

Y=3.875

———— d Line
············ g Line
−·−·− C Line

−0.01   0.01
LATERAL
CHROMATIC
ABERRATION

Y=3.875

——— S
······ M

−0.3   0.3
ASTIGMATISM

Y=3.875

−20.0   20.0%
DISTORTION

Y= 0.00     +0.03

−0.03

Y= 1.60     +0.03

−0.03

Y= 3.10     +0.03

−0.03

Y= 3.88     +0.03

———— d Line
            −0.03

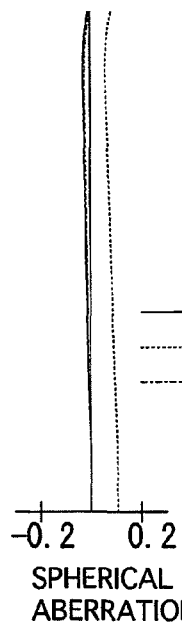
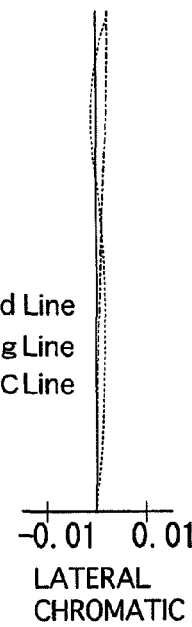
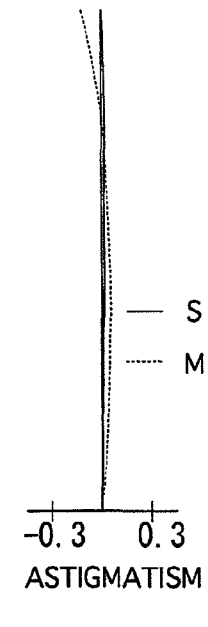
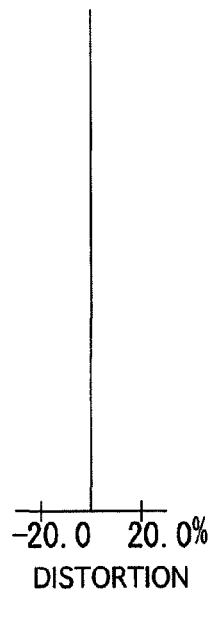
Fig. 5A  Fig. 5B  Fig. 5C  Fig. 5D
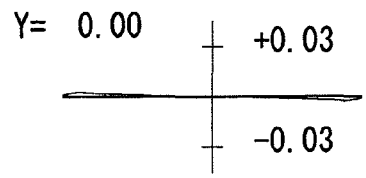
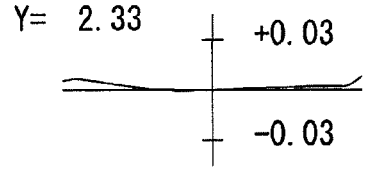
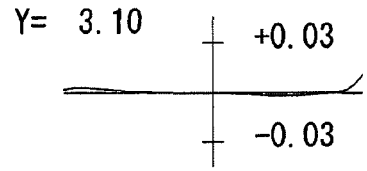
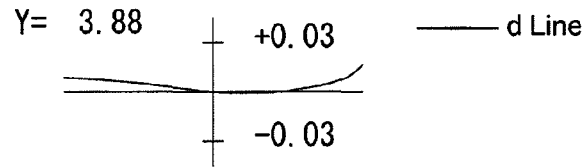
Fig. 6A
Fig. 6B
Fig. 6C
Fig. 6D

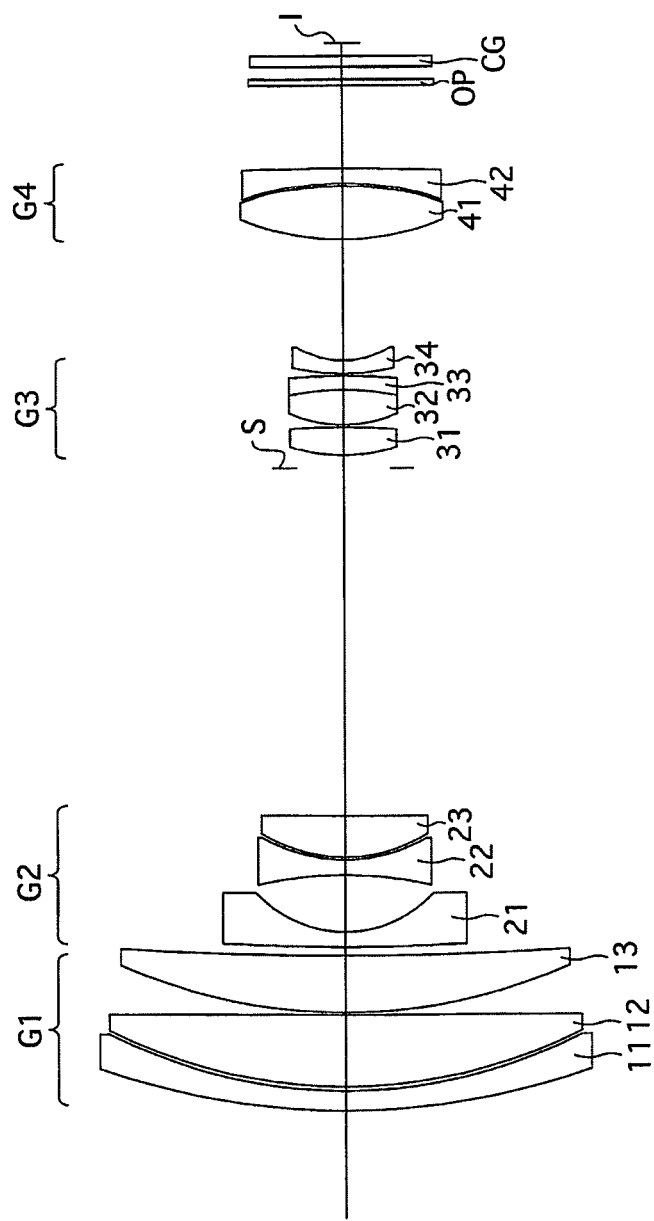

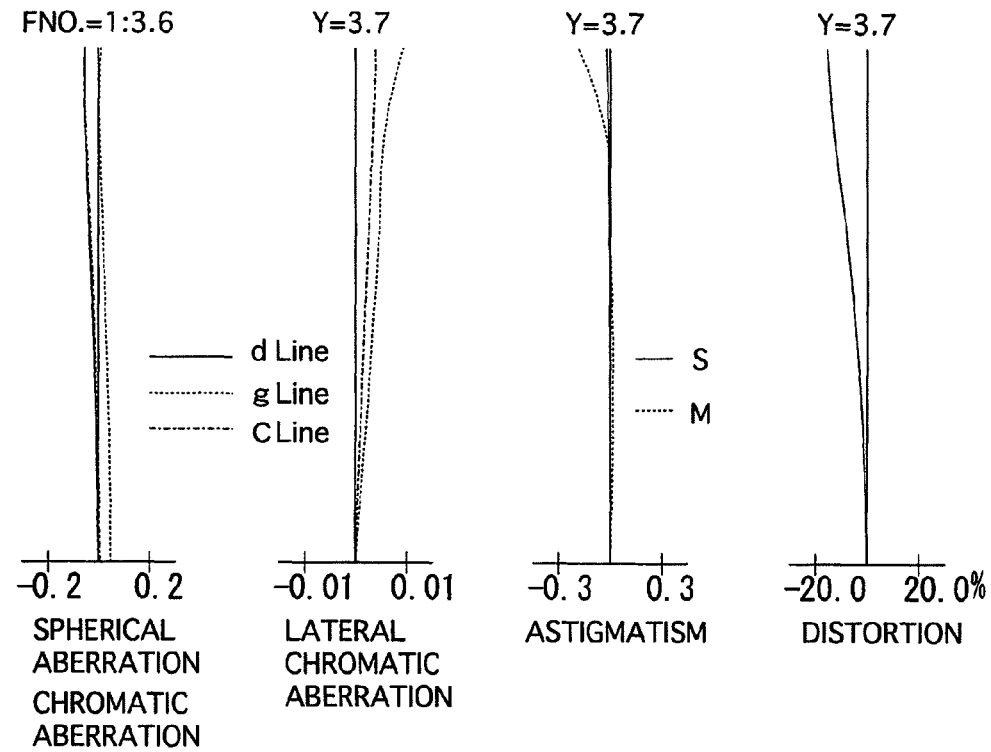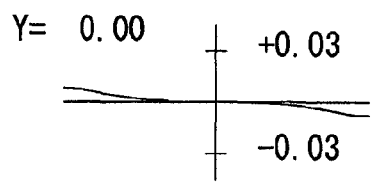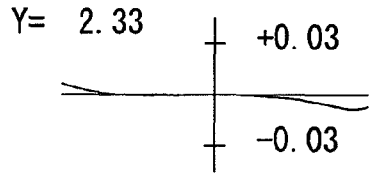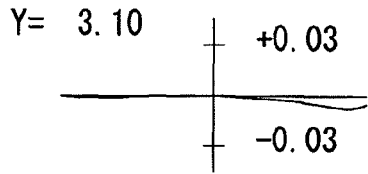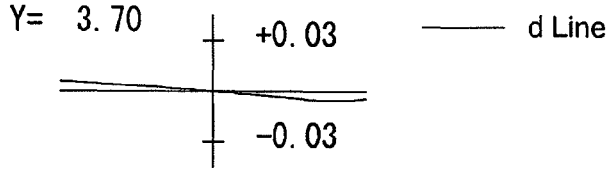

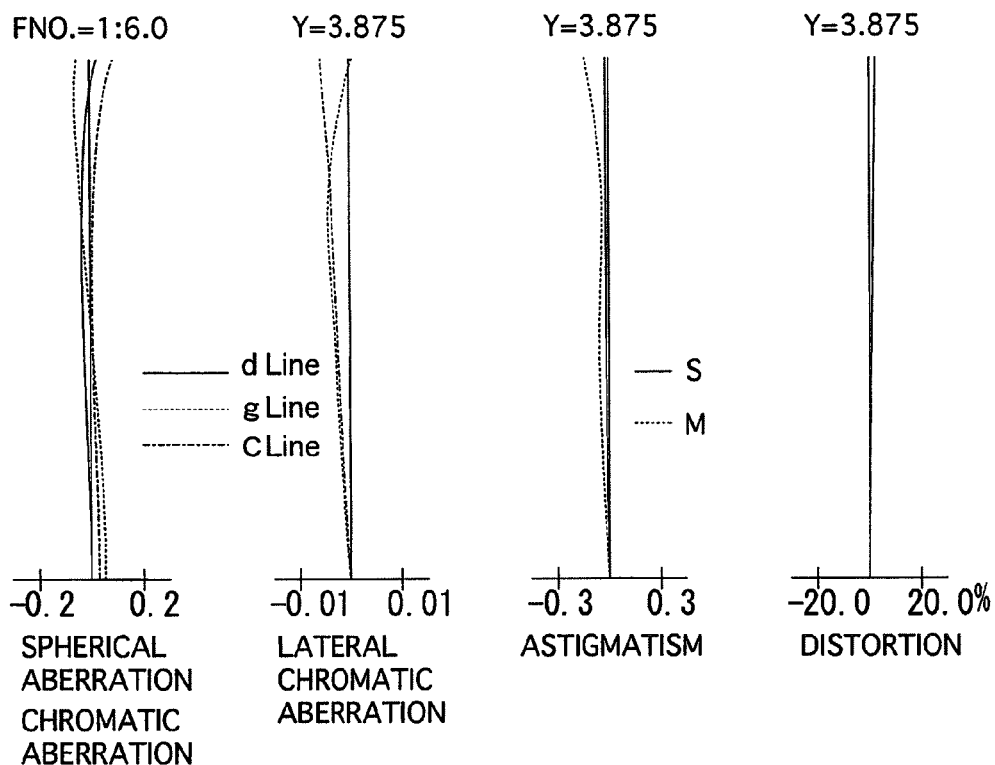
Fig. 11A FNO.=1:6.0 SPHERICAL ABERRATION CHROMATIC ABERRATION
Fig. 11B Y=3.875 LATERAL CHROMATIC ABERRATION
Fig. 11C Y=3.875 ASTIGMATISM
Fig. 11D Y=3.875 DISTORTION
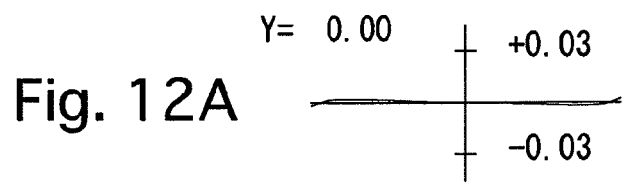
Fig. 12A  Y= 0.00
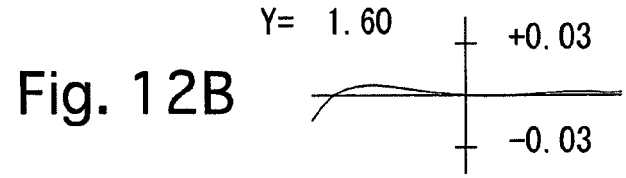
Fig. 12B  Y= 1.60
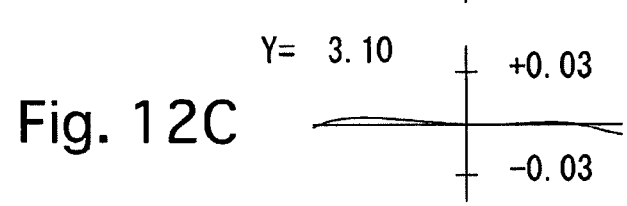
Fig. 12C  Y= 3.10
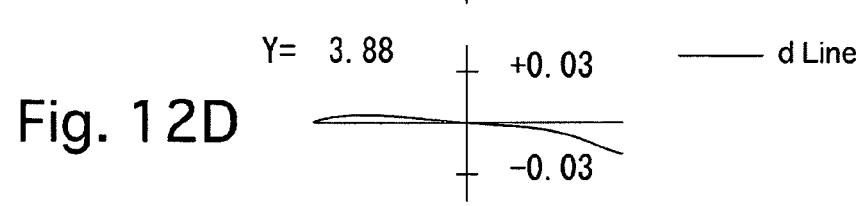
Fig. 12D  Y= 3.88

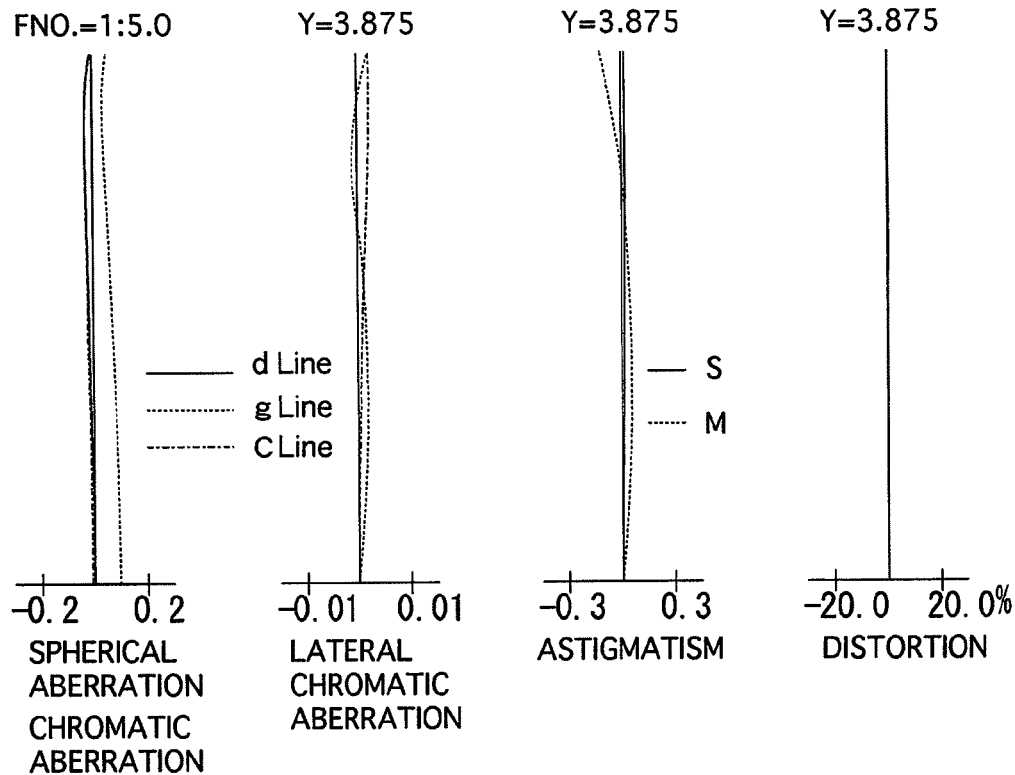
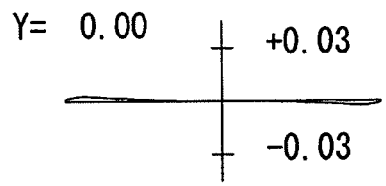
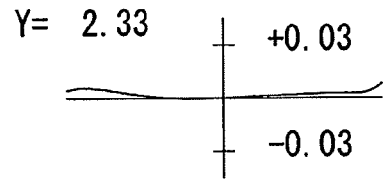
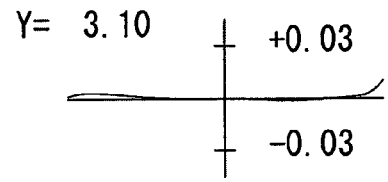
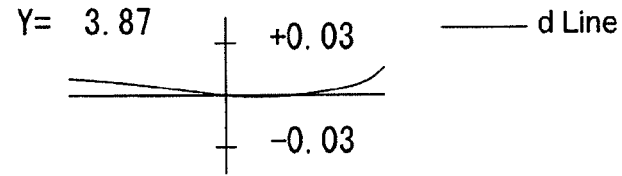

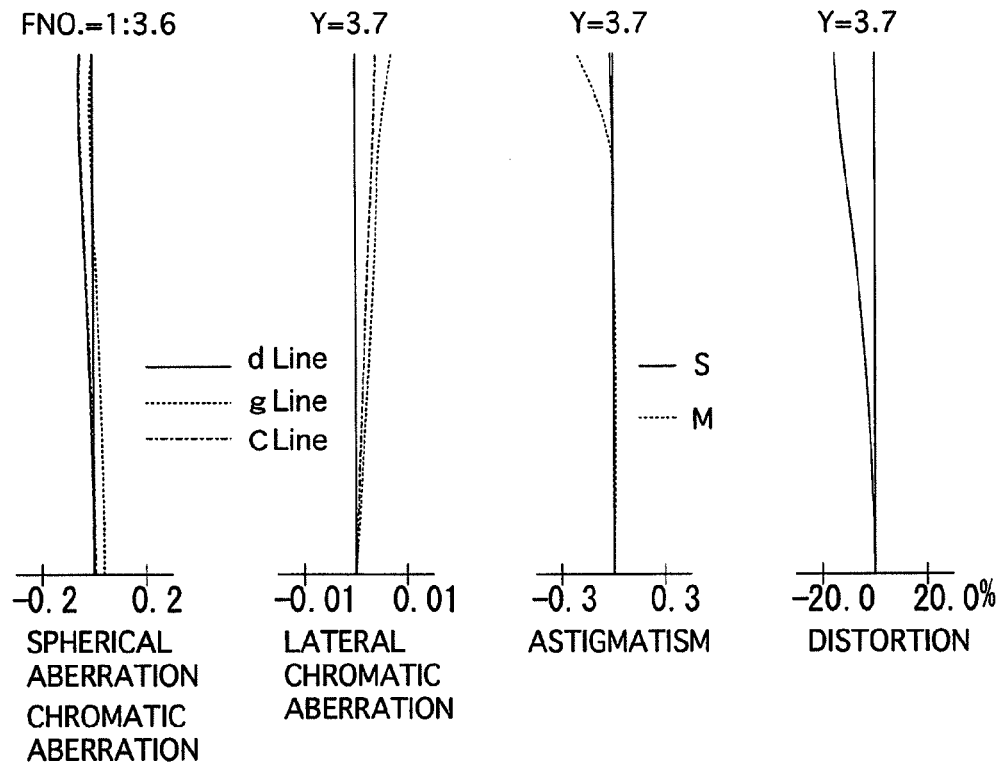
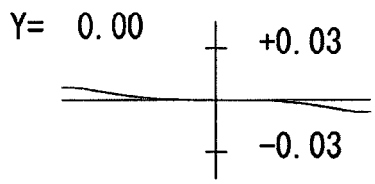
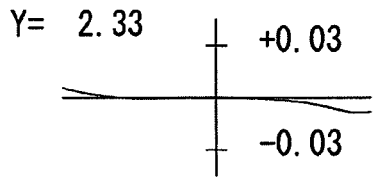
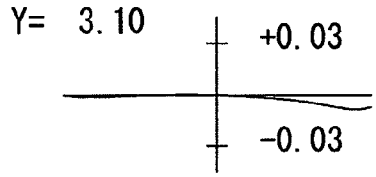
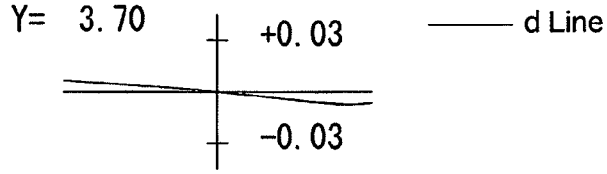

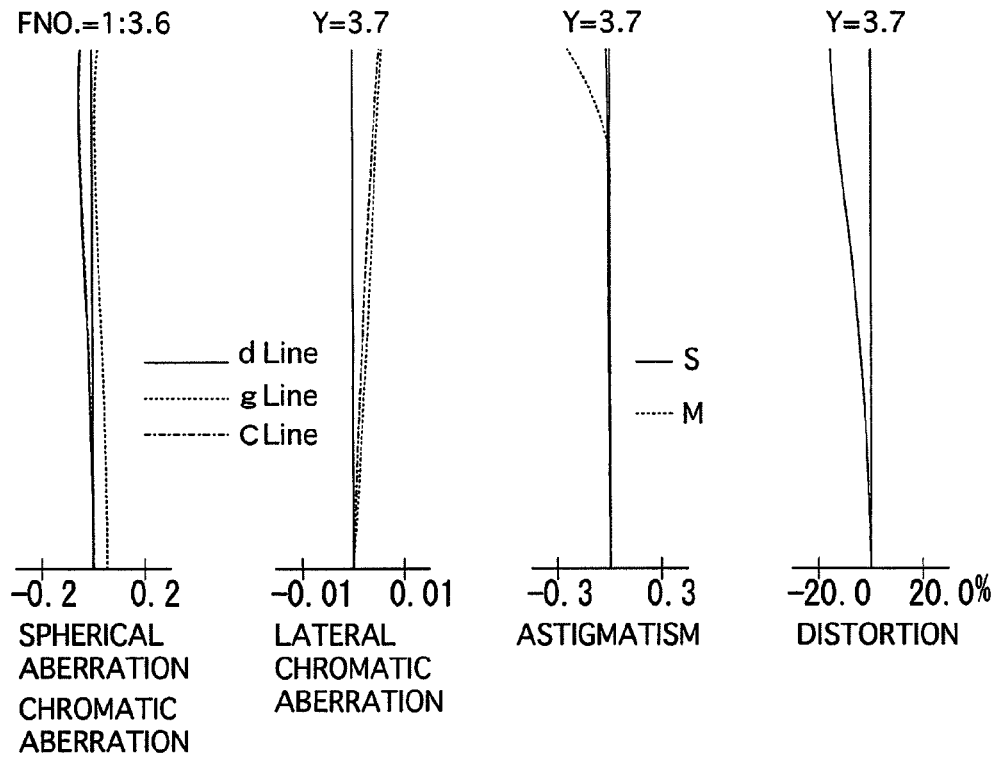
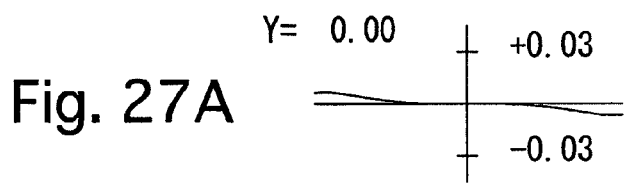
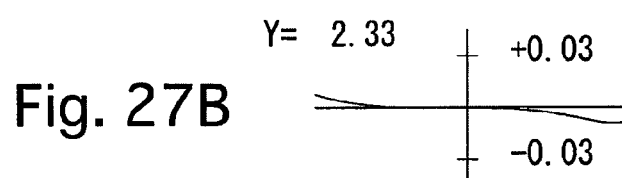
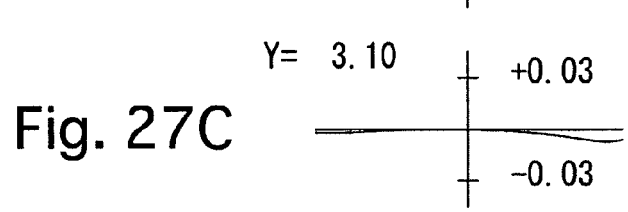
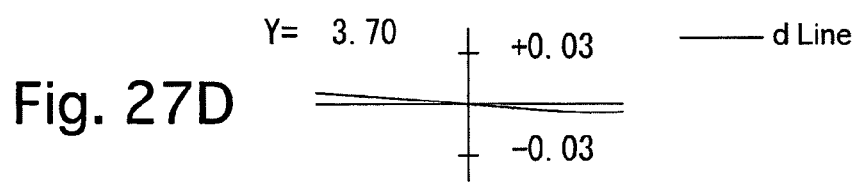

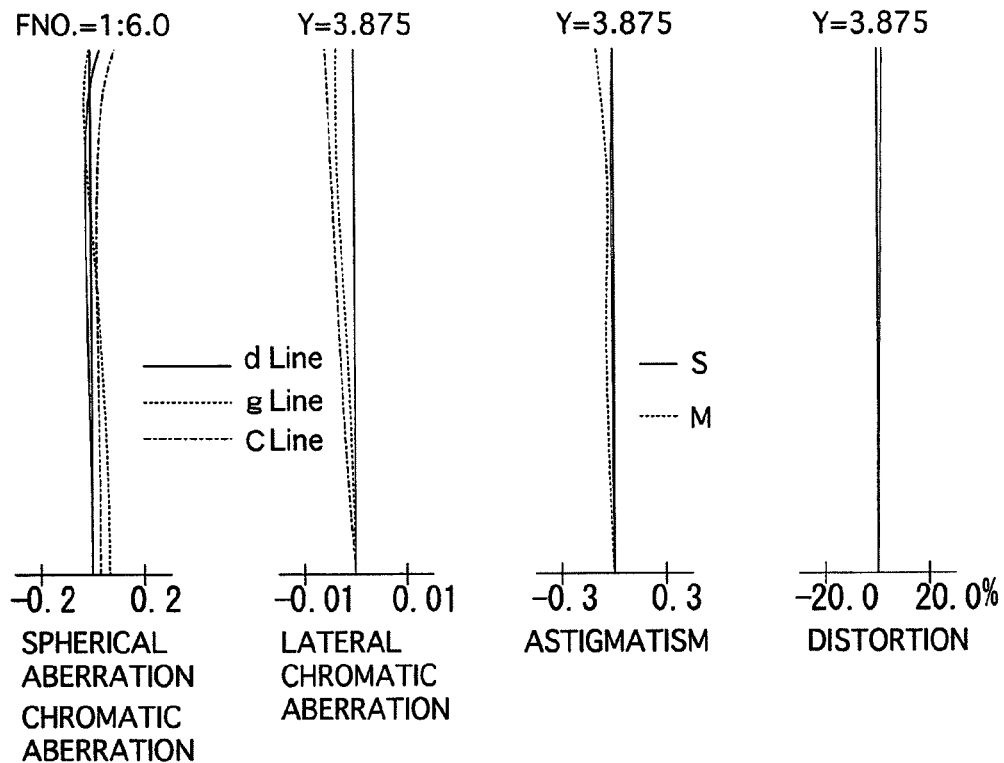
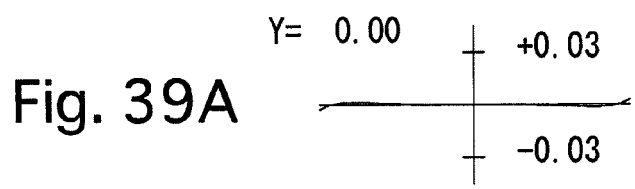
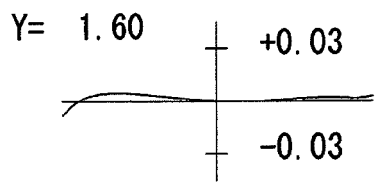
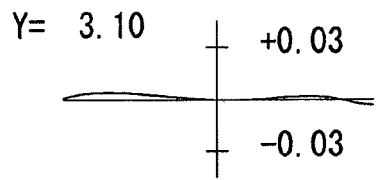
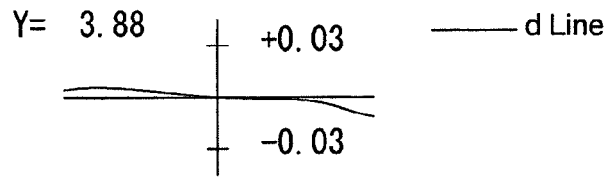

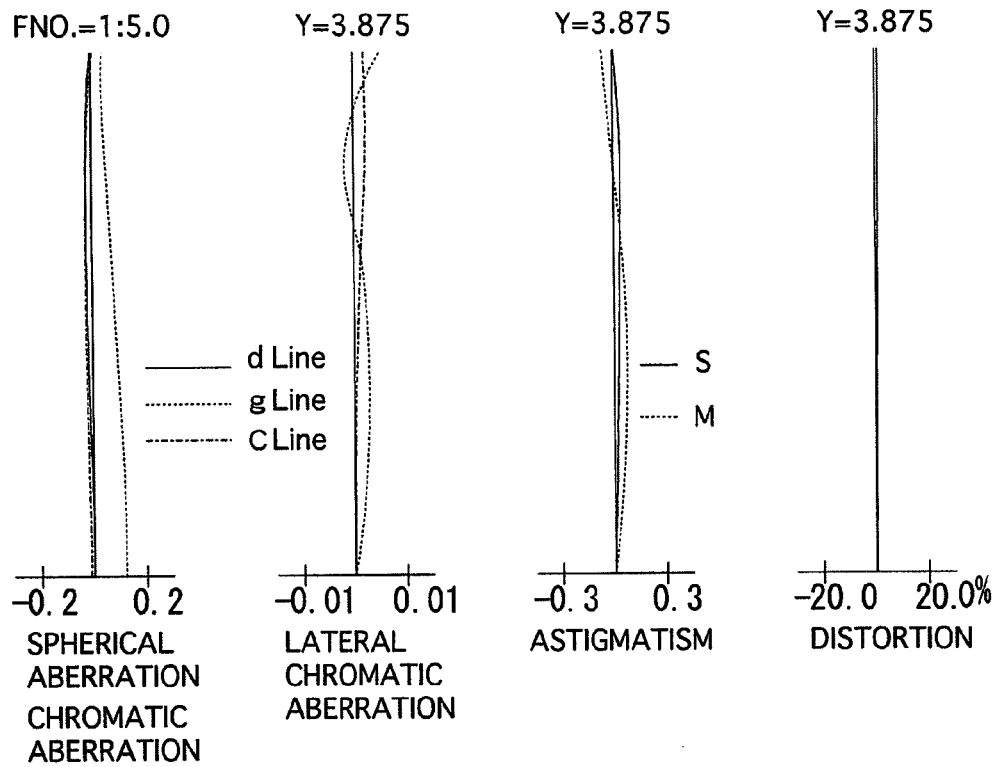
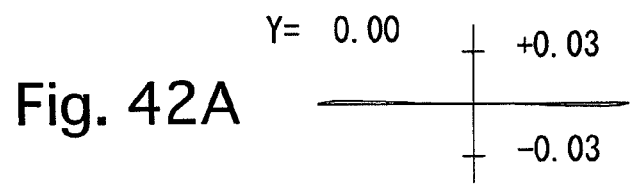
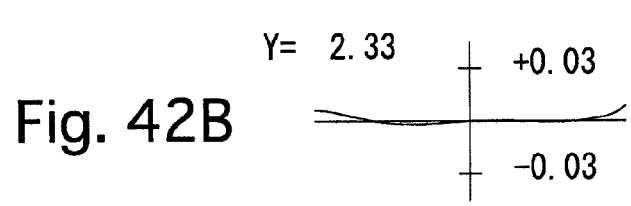
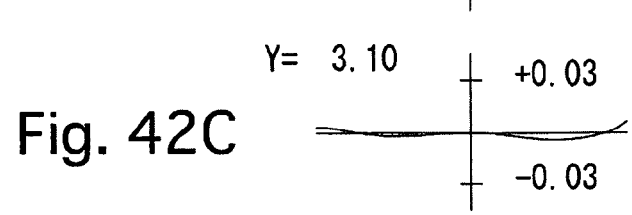
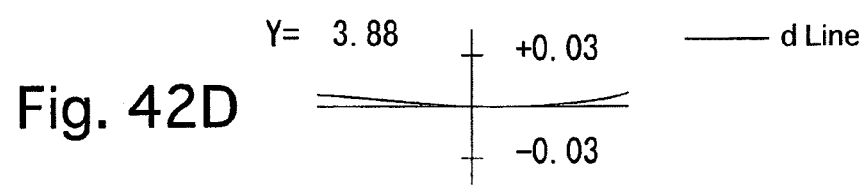

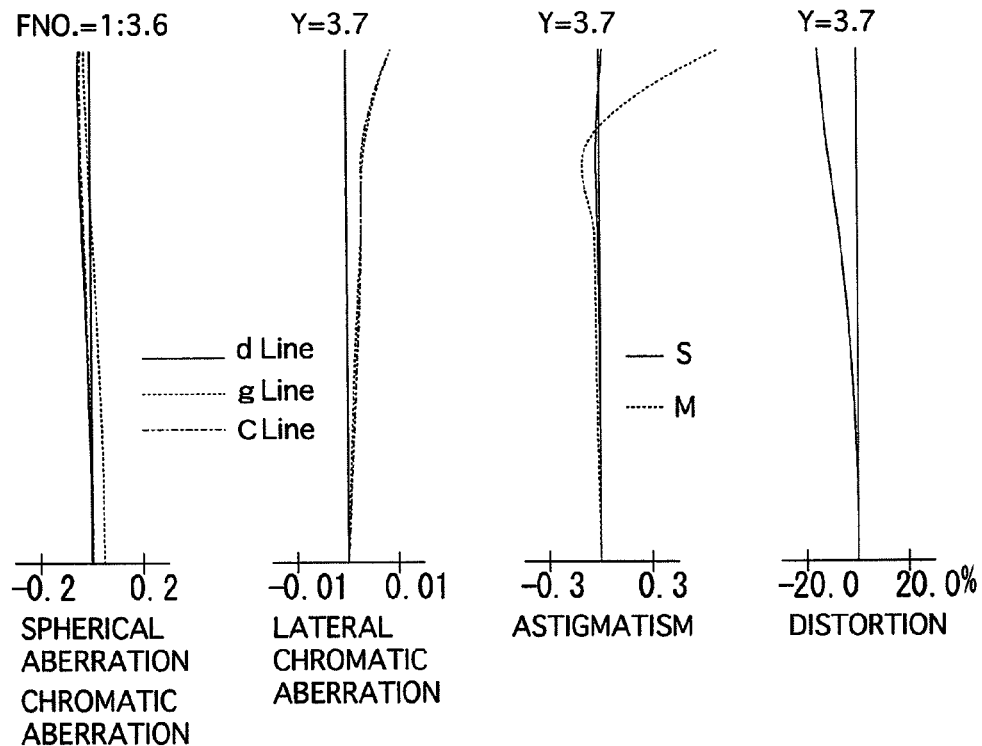
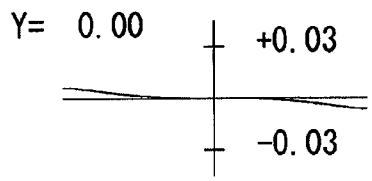
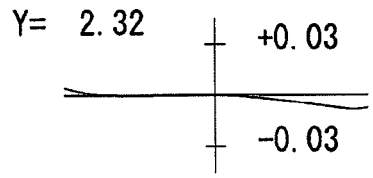
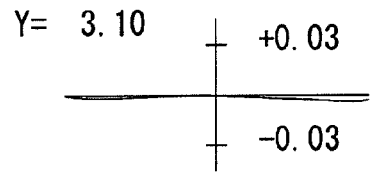
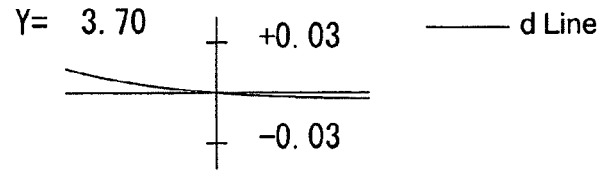

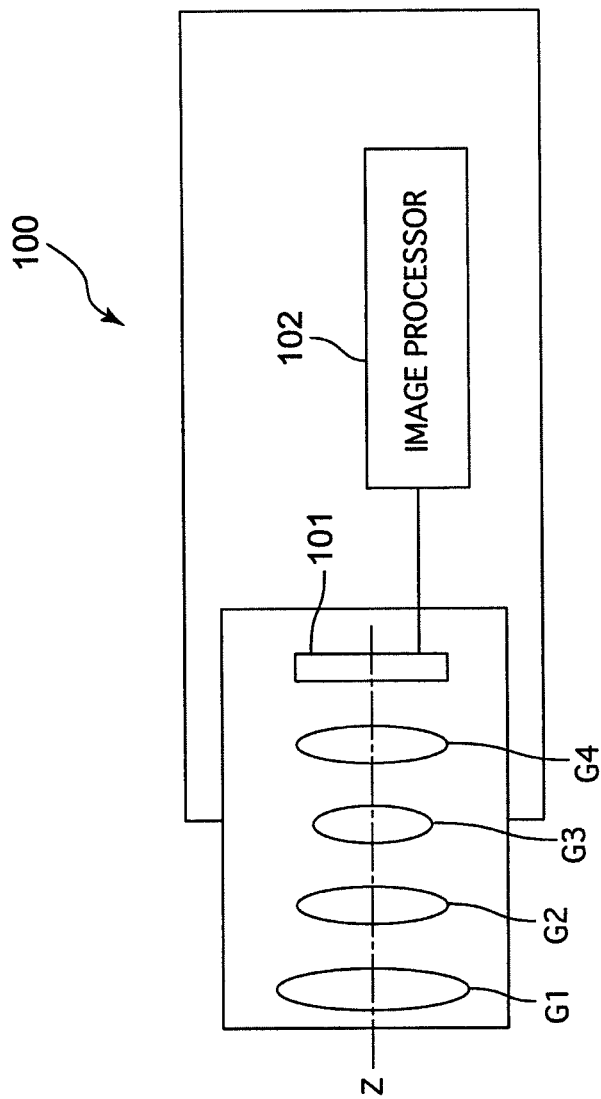

HIGH ZOOM-RATIO ZOOM LENS SYSTEM AND ELECTRONIC IMAGING APPARATUS USING THE SAME

BACKGROUND OF THE INVENTION

1. Field of the Invention

The present invention relates to a high zoom-ratio zoom lens system which is suitable as an imaging optical system for use mainly with an imaging sensor, the high zoom-ratio zoom lens system having a wide angle-of-view of a half angle-of-view of approximately 35 degrees. The present invention also relates to an electronic imaging apparatus which uses such a high zoom-ratio zoom lens system.

2. Description of Related Art

In recent years, there has been an increased need for digital cameras that have a high zoom-ratio zoom lens system including a wide angle-of-view range. In addition, further advancements in the miniaturization of the pixel pitch have been made, requiring the optical system to have a higher resolution. In an imaging lens system that is for use mainly in a compact camera, it is common for such a compact camera to achieve a slim design via the employment of a retractable barrel mechanism, in which the air-distances between lens groups are reduced at a lens barrel retracted state (accommodated state). However, when designing a zoom lens system which is suitable for such a retractable barrel mechanism, in addition to reducing the thickness of each lens group in a lens system, it is also necessary for the frontmost lens to be small in diameter, and furthermore, for this lens system to be designed with consideration of the mechanical restrictions in regard to the overall length thereof.

Zoom lens systems for use in high zoom-ratio compact cameras are known in the art; for example, such as those proposed in Japanese Unexamined Patent Publication Nos. 2006-23529 and 2006-308957; these zoom lens systems have relatively few lens elements and achieve miniaturization. However, in the zoom lens system disclosed in Japanese Unexamined Patent Publication No. 2006-23529, the zoom ratio is approximately 5:1 and the angle-of-view at the short focal length extremity is 61 degrees, and hence, does not achieve a sufficiently wide angle-of-view nor a sufficiently high zoom ratio. Furthermore, in the zoom lens system disclosed in Japanese Unexamined Patent Publication No. 2006-308957, a wide angle-of-view of 78 degrees at the short focal length extremity is achieved, however, the zoom ratio is within a range of approximately 4:1 through 7:1, which is still unsatisfactory. The zoom lens system disclosed in Japanese Unexamined Patent Publication No. 2008-112013 is relatively compact, and achieves both a wide angle-of-view and a high zoom ratio; however, a large amount of astigmatism and chromatic aberration occur, and hence, cannot attain the standard required in a zoom lens system that is suitable for high pixelization.

SUMMARY OF THE INVENTION

The present invention provides a high zoom-ratio zoom lens system having a zoom ratio of 15:1 or more, an angle-of-view of 70 degrees or more at the short focal length extremity, a small frontmost lens diameter, and which is ideal for application in a retractable camera that has a short overall length at the short focal length extremity. The present invention also provides an electronic imaging apparatus which uses such a high zoom-ratio zoom lens system.

According to an aspect of the present invention, a high zoom-ratio zoom lens system is provided, including a positive first lens group, a negative second lens group, a positive third lens group and a positive fourth lens group, in that order from the object side. Upon zooming from the short focal length extremity to the long focal length extremity, at least the first through third lens groups move along the optical axis direction in a manner so that the distance between the first lens group and the second lens group increases, the distance between the second lens group and the third lens group decreases, and the distance between the third lens group and the fourth lens group increases, wherein the amount of movement of the first lens group during zooming is larger than that of the third lens group. The first lens group includes a negative lens element, a positive lens element, and a positive lens element, in that order from the object side. The absolute value of the radius of curvature of the surface on the image side of the negative lens element which is provided within the first lens group is smaller than the absolute value of the radius of curvature of the surface on the object side of the positive lens element which is provided on the object side within the first lens group. The following condition (1) is satisfied:

$$1.95 < n11 \quad (1),$$

wherein n11 designates the refractive index at the d-line of the negative lens element which is provided within the first lens group.

It is desirable for the following condition (2) to be satisfied:

$$v12 > 90 \quad (2),$$

wherein v12 designates the Abbe number with respect to the d-line of the positive lens element which is provided on the object side within the first lens group.

It is desirable for the following condition (3) to be satisfied:

$$-0.3 < DW < -0.1 \quad (3),$$

wherein DW designates the distortion at the maximum image height (diagonal image height) at the short focal length extremity.

In an embodiment, an electronic imaging apparatus is provided, including the above-described high zoom-ratio zoom lens system, and an electronic imaging sensor, onto which an image is formed via the high zoom-ratio zoom lens system. Distortion is corrected by image-processing image data which is photoelectrically converted by the electronic imaging sensor.

In an embodiment, a method of reducing a frontmost lens diameter of the high zoom-ratio zoom lens system according the above-described structure, which is installed in an electronic imaging apparatus, is provided, wherein the electronic imaging apparatus includes an electronic imaging sensor onto which an image is formed via the high zoom-ratio zoom lens system. This method includes arranging the high zoom-ratio zoom lens system so as to allow distortion to occur therein; and correcting the distortion by image-processing image data which is photoelectrically converted by the electronic imaging sensor, wherein the following condition (3) is satisfied:

$$-0.3 < DW < -0.1 \quad (3),$$

wherein DW designates the distortion at the maximum image height at the short focal length extremity.

According to the present invention, a high zoom-ratio zoom lens system is achieved, having a zoom ratio of 15:1 or more, an angle-of-view of 70 degrees or more at the short focal length extremity, a small frontmost lens diameter, and which is ideal for application in a retractable camera that has a short overall length at the short focal length extremity. An electronic imaging apparatus which uses such a high zoom-ratio zoom lens system is also achieved.

The present disclosure relates to subject matter contained in Japanese Patent Application No. 2010-205962 (filed on Sep. 14, 2010) which is expressly incorporated herein in its entirety.

BRIEF DESCRIPTION OF THE DRAWINGS

The present invention will be discussed below in detail with reference to the accompanying drawings, in which:

FIGS. 5A, 5B, 5C and 5D show various aberrations that occurred in the lens arrangement shown in FIG. 4;

FIGS. 6A, 6B, 6C and 6D show lateral aberrations that occurred in the lens arrangement shown in FIG. 4;

FIG. 7 shows the lens arrangement of the first numerical embodiment at the short focal length extremity when focused on an object at infinity;

FIGS. 8A, 8B, 8C and 8D show various aberrations that occurred in the lens arrangement shown in FIG. 7;

FIGS. 9A, 9B, 9C and 9D show lateral aberrations that occurred in the lens arrangement shown in FIG. 7;

FIGS. 11A, 11B, 11C and 11D show various aberrations that occurred in the lens arrangement shown in FIG. 10;

FIGS. 12A, 12B, 12C and 12D show lateral aberrations that occurred in the lens arrangement shown in FIG. 10;

FIGS. 14A, 14B, 14C and 14D show various aberrations that occurred in the lens arrangement shown in FIG. 13;

FIGS. 15A, 15B, 15C and 15D show lateral aberrations that occurred in the lens arrangement shown in FIG. 13;

FIGS. 17A, 17B, 17C and 17D show various aberrations that occurred in the lens arrangement shown in FIG. 16;

FIGS. 18A, 18B, 18C and 18D show lateral aberrations that occurred in the lens arrangement shown in FIG. 16;

FIGS. 26A, 26B, 26C and 26D show various aberrations that occurred in the lens arrangement shown in FIG. 25;

FIGS. 27A, 27B, 27C and 27D show lateral aberrations that occurred in the lens arrangement shown in FIG. 25;

FIGS. 38A, 38B, 38C and 38D show various aberrations that occurred in the lens arrangement shown in FIG. 37;

FIGS. 39A, 39B, 39C and 39D show lateral aberrations that occurred in the lens arrangement shown in FIG. 37;

FIGS. 41A, 41B, 41C and 41D show various aberrations that occurred in the lens arrangement shown in FIG. 40;

FIGS. 42A, 42B, 42C and 42D show lateral aberrations that occurred in the lens arrangement shown in FIG. 40;

FIGS. 44A, 44B, 44C and 44D show various aberrations that occurred in the lens arrangement shown in FIG. 43;

FIGS. 45A, 45B, 45C and 45D show lateral aberrations that occurred in the lens arrangement shown in FIG. 43;

FIG. 47 is a schematic view of an electronic imaging device in which the high zoom-ratio zoom lens system according to the present invention is installed.

DESCRIPTION OF THE EMBODIMENTS

Figure 46:
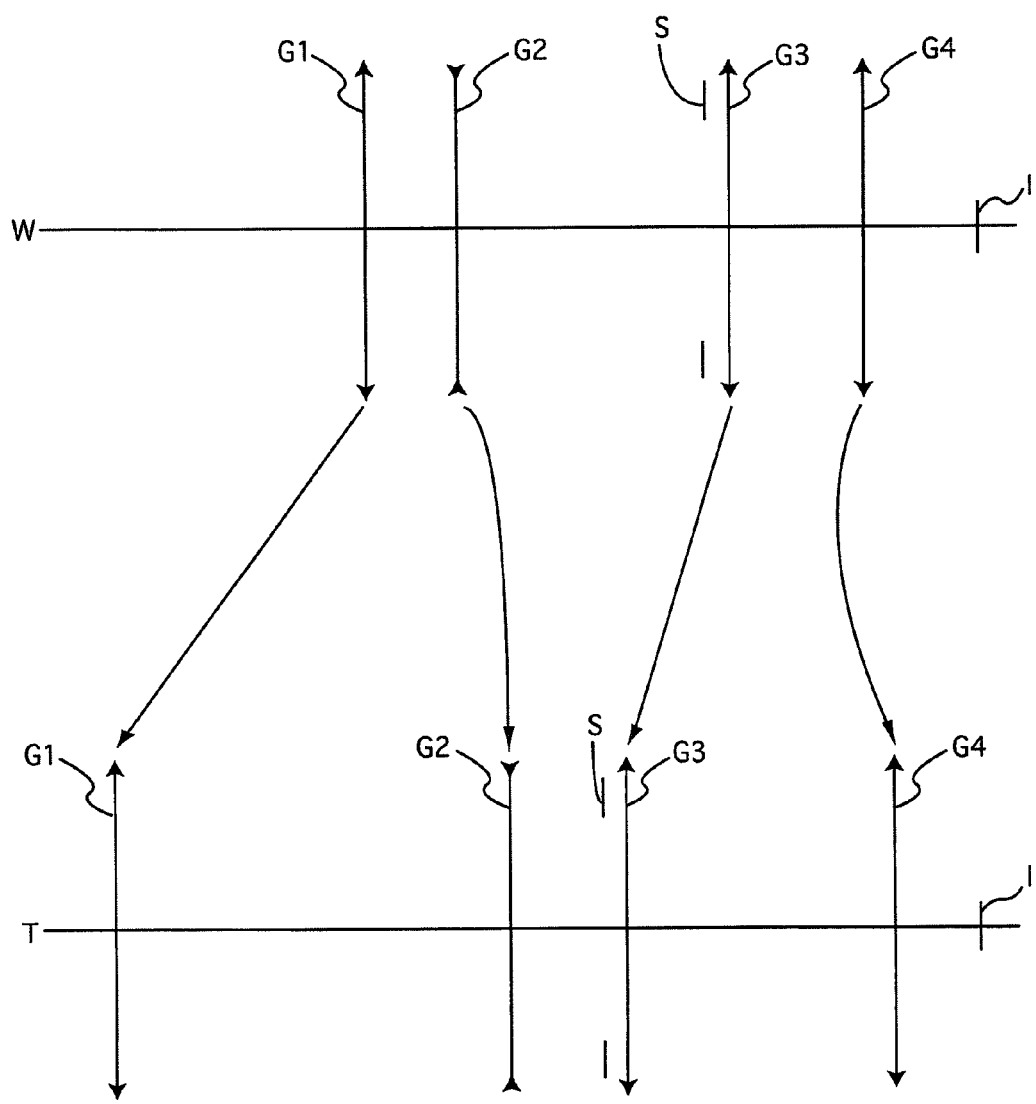
FIG. 46 shows a zoom path of the high zoom-ratio zoom lens system according to the present invention.

The high zoom-ratio zoom lens system according to the present invention, as shown in the zoom path of FIG. 46, is configured of a positive first lens group G1, a negative second lens group G2, a positive third lens group G3 and a positive fourth lens group G4, in that order from the object side. A diaphragm S is provided in between the second lens group G2 and the third lens group G3 and moves integrally with the third lens group G3 along the optical axis. Focusing is performed by the fourth lens group G4. "I" designates the imaging plane of the high zoom-ratio zoom lens system.

Upon zooming from the short focal length extremity (W) to the long focal length extremity (T), the first through fourth lens groups G1 through G4 move along the optical axis direction in a manner in which the distance between the first lens group G1 and the second lens group G2 increases, the distance between the second lens group G2 and the third lens group G3 decreases, and the distance between the third lens group G3 and the fourth lens group G4 increases. More specifically, upon zooming from the short focal length extremity (W) to the long focal length extremity (T), the first lens group G1 moves monotonically toward the object side, the second lens group G2 moves toward the image side while plotting a convex curve that faces the image side, the third lens group G3 monotonically moves toward the object side, and the fourth lens group first moves toward the object side and thereafter moves toward the image side. The amount of movement of the first lens group G1 during zooming (telescoping amount toward the object side) is larger than the amount of movement of the third lens group G3 (telescoping amount toward the object side). Note that the movement path of the second lens group G2 is not limited to that shown in FIG. 46, and can alternatively be, for example, a convex path facing the object side while the second lens group G2 moves along the optical axis, an S-shaped path while the second lens group G2 moves along the optical axis. However, the amount of movement of the second lens group G2 during zooming should be relatively smaller compared to those of the other lens groups. Furthermore, it is acceptable for the fourth lens group G4 to remain at a fixed location with respect to the optical axis direction (to remain stationary with respect to the optical axis direction).

In each of the first through fifth numerical embodiments, the first lens group G1 is configured of a negative lens element 11, a positive lens element 12 and a positive lens element 13, in that order from the object side.

In each of the first through fifth numerical embodiments, the second lens group G2 is configured of a negative lens element 21, a negative lens element 22, and a positive lens element 23, in that order from the object side. In each of the first through third numerical embodiments, the negative lens element 21 has spherical surfaces, and in the fourth and fifth numerical embodiments, the negative lens element 21 has an aspherical surface on the object side thereof. In each of the first through fifth numerical embodiments, the positive lens element 23 has an aspherical surface on each side thereof.

In each of the first through third numerical embodiments, the third lens group G3 is configured of a positive lens element 31; a cemented lens provided with a positive lens element 32 and a negative lens element 33; and a negative lens element 34, in that order from the object side. The positive lens element 31, which is provided closest to the object side (within the third lens group G3), has an aspherical surface on each side thereof.

In each of the fourth and fifth numerical embodiments, the third lens group G3 is configured of a positive lens element 31'; a cemented lens provided with a positive lens element 32' and a negative lens element 33', in that order from the object side. The positive lens element 31' which is provided closest to the object side (within the third lens group G3), has an aspherical surface on each side thereof.

In each of the first through fifth numerical embodiments, the fourth lens group G4 is configured of a positive lens element 41 and a negative lens element 42, in that order from the object side. The positive lens element 41 has an aspherical surface on the object side thereof. The negative lens element 42 has an aspherical surface on each side thereof. It is possible to configure the fourth lens group G4 out of a single positive lens element if the optical quality at the close distance is sacrificed to an extent.

In order to miniaturize a camera in which a retractable zoom lens system that utilizes a multi-stage lens barrel is installed, reduction in the diameter of the first lens group, which is positioned closest to the object side, and the reduction in the overall length of the zoom lens system are important. Furthermore, the thickness of each lens group is required to be small (thin). Simplification of the mechanical structure that moves the lens groups in order to perform zooming is also necessary. Generally, the mechanical structure can be simplified by reducing the number of lens groups that are used to perform zooming, however, it is difficult to achieve a high zoom-ratio zoom lens system with such an arrangement. Furthermore, reducing the number of lens elements in order to miniaturize the zoom lens system and to reduce the thickness of each lens group results in an increased difficulty in correcting aberrations. Hence, it becomes necessary to provide an appropriate refractive power distribution for each lens group and to provide an appropriate lens arrangement in order to favorably correct the various aberrations over the entire zooming range while achieving a miniaturized zoom lens system.

The high zoom-ratio zoom lens system according to the present invention is a positive-lead lens system and has the advantage of being able to achieve a higher zoom ratio than a negative-lead lens system, which is typically used in a compact camera. However, positive-lead lens systems have the disadvantage of the frontmost lens diameter easily increasing, so that even if a multi-stage (telescoping) lens barrel is utilized in order to retract and accommodate the lens system, the diameter of the lens barrel still increases to the extent where such an enlarged lens barrel can no longer be installed into a compact camera. Hence, in order to solve this problem, by moving the first lens group G1 along the optical axis direction (advancing toward the object side) by a larger amount than that of the third lens group G3 upon zooming from the short focal length extremity to the long focal length extremity, the amount of movement freedom of the second and third lens groups G2 and G3 increase, so as to attain an optimum ratio of the zoom burden on the second and third lens groups G2 and G3. For example, if the first lens group G1 is immovable in the optical axis direction, the zooming burden on the second lens group G2 increases, which results in the diameter of the first lens group G1 easily increasing.

In a so-called retractable zoom lens system, in which the distances between the lens groups are reduced upon retracting to an accommodation position by utilizing a multi-stage lens barrel in order to increase the portability of the camera when not in use, it is necessary to reduce the thickness (distance) of each lens group and reduce the overall length of the zoom lens system. In a positive-lead high zoom-ratio zoom lens system, since the overall length of the zoom lens system can be reduced at the long focal length extremity by increasing the positive refractive power of the first lens group G1, the first lens group G1 of the present invention is configured of a negative lens element, a positive lens element, and a positive lens element, in that order from the object side (a total of three lens elements).

However, the thickness and the diameter of the first lens group G1 easily increases with such an arrangement in which the first lens group G1 is configured of a negative lens element, a positive lens element, and a positive lens element, in that order from the object side; in order to prevent such a problem, in the high zoom-ratio zoom lens system of the present invention, the absolute value of the radius of curvature of the surface on the image side of the negative lens element (first lens element) which is provided within the first lens group G1 is set smaller than the absolute value of the radius of curvature of the surface on the object side of the positive lens element (second lens element) which is provided on the object side within the first lens group G1. Accordingly, a sufficient amount of chromatic aberration correction can be carried out by the negative lens element (first lens element) provided in the first lens group G1; and the positive refractive power of the positive lens element (second lens element) provided on the object side and the positive refractive power of the positive lens element (third lens element) provided on the image side of the first lens group G1 can be made approximately equal (within a predetermined common range), which enables the reduction in the thickness of the first lens group G1.

If the absolute value of the radius of curvature of the surface on the image side of the negative lens element (first lens element) within the first lens group G1 is the same or larger than the absolute value of the radius of curvature of the surface on the object side of the positive lens element (second lens element) which is provided on the object side within the first lens group G1, the thickness of the positive lens element (second lens element) which is provided on the object side within the first lens group G1 increases in order to attain a sufficient thickness at the peripheral edge portion thereof, which is undesirable.

Condition (1) specifies the refractive index at the d-line of the negative lens element (first lens element) within the first lens group G1, and is for reducing the thickness and outer diameter of the first lens group G1.

If the lower limit of condition (1) is exceeded, the thickness and outer diameter of the first lens group G1 increases, which is unsuitable for a photographic lens system for use in a compact camera.

Condition (2) specifies the Abbe number with respect to the d-line of the positive lens element (second lens element) provided on the object side within the first lens group G1. Condition (2) is for favorably correcting chromatic aberration, and in particular, is for reducing axial chromatic aberration which easily occurs mainly at the long focal length extremity in a high zoom-ratio zoom lens system that achieves miniaturization. As described above, in order to reduce the overall length of the zoom lens system at the long focal length extremity, it is necessary to strengthen the positive refractive power of the first lens group G1, however, if the positive refractive power of the first lens group G1 is strengthened, chromatic aberration easily occurs. Therefore, it is necessary for the positive lens element (second lens element) provided on the object side within the first lens group G1 to be formed by a glass material having an Abbe number within a range which satisfies condition (2).

If the positive lens element (second lens element) provided on the object side within the first lens group G1 is formed from a glass material having an Abbe number that exceeds the range specified by condition (2), chromatic aberration (axial chromatic aberration) cannot be favorably corrected.

Condition (3) specifies the amount of distortion that occurs in the high zoom-ratio zoom lens system according to the present invention.

When distortion D occurs, the following relationship between the image height Y, the focal length f and the half angle-of-view W exists:

$$Y = f*\tan W(1+D)$$

For example, if the focal length and the angle-of-view are constant, the required image height Y is reduced in the case where negative (barrel) distortion occurs. In the case of a positive-lead zoom lens system like that of the present invention, if attempts are made to correct (reduce) the distortion while increasing the angle-of-view, there is a problem of the diameter of the frontmost lens element of the first lens group G1 easily increasing (the diameter of the frontmost lens element must be increased in order to correct the distortion), however, by intentionally allowing a certain amount of negative distortion to occur at the short focal length extremity and at the close vicinity thereof, an increase in the diameter of the frontmost lens element can be prevented. Accordingly, by allowing a certain amount of negative distortion so as to satisfy condition (3), a high zoom-ratio zoom lens system having a wide angle-of-view can be achieved without needing to enlarge the diameter of the frontmost lens element of the first lens group G1.

If the upper limit of condition (3) is exceeded, although it is advantageous with respect to the peripheral resolution of the imaging plane, if attempts are made to correct distortion while achieving a wide angle-of-view, the effect of making the diameter of the frontmost lens element of the first lens group G1 smaller reduces.

If the lower limit of condition (3) is exceeded, deterioration of the resolving power upon correcting the image distortion increases, which is undesirable.

FIG. 47 shows a schematic view of an electronic imaging device 100 in which the high zoom-ratio zoom lens system according to the present invention is installed. The electronic imaging device 100 is provided with an electronic imaging sensor 101 and an image processor 102 which image-processes the image data, which is photoelectrically converted by the electronic imaging sensor 101, to correct distortion that has occurred in the high zoom-ratio zoom lens system. Namely, by satisfying condition (3), the intentionally allowed distortion is corrected by the image processor 102, so that the diameter of the frontmost lens element (of the first lens group G1) can be miniaturized while still attaining a superior image quality.

EMBODIMENTS

Specific numerical embodiments will be herein discussed. The following numerical embodiments are applied to the high zoom-ratio zoom lens system of the present invention being used in a compact digital camera. In the aberration diagrams, lateral aberration diagrams and the tables, the d-line, g-line, and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and ν d designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
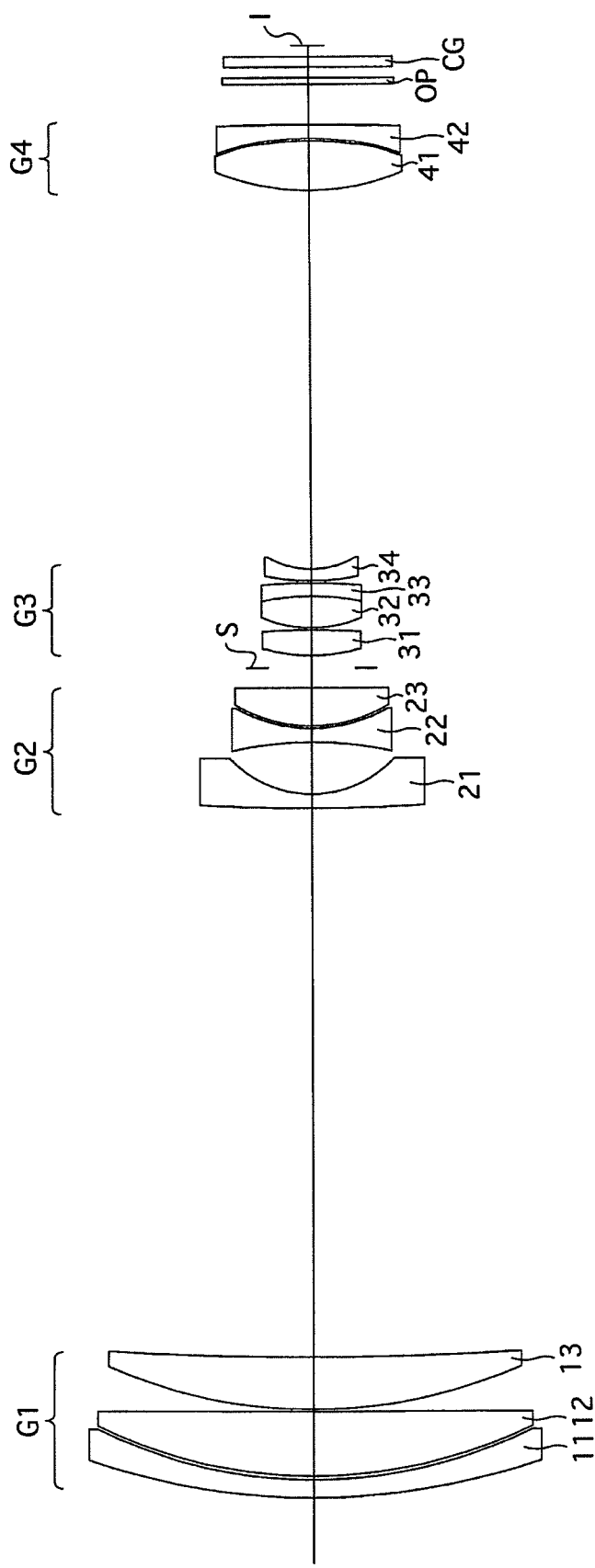
FIG. 1 shows a lens arrangement of a first numerical embodiment of a high zoom-ratio zoom lens system, according to the present invention, at the long focal length extremity when focused on an object at infinity.
Figure 2A:
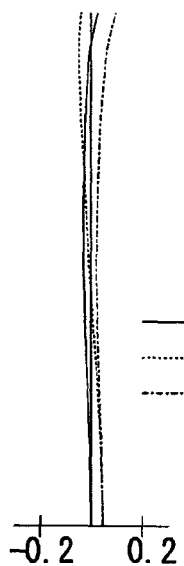
FIGS. 2A, 2B, 2C and 2D show various aberrations that occurred in the lens arrangement shown in FIG. 1.
Figure 2B:
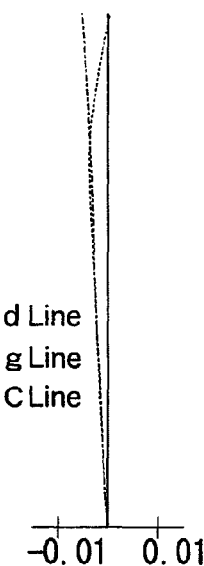
Figure 2C:
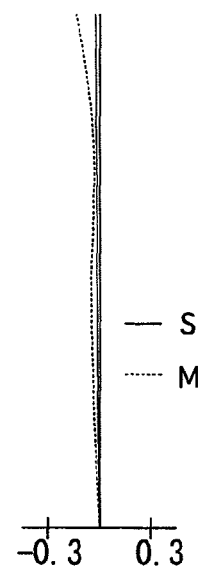
Figure 2D:
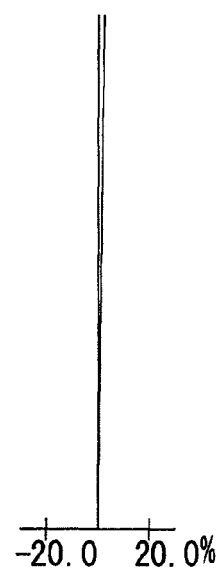
Figure 3A:
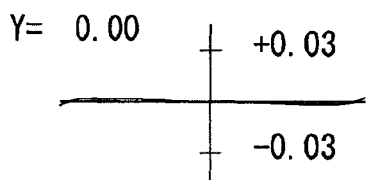
FIGS. 3A, 3B, 3C and 3D show lateral aberrations that occurred in the lens arrangement shown in FIG. 1.
Figure 3B:
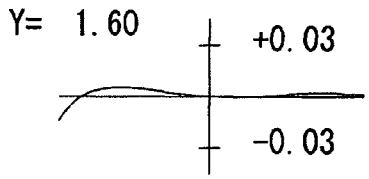
Figure 3C:
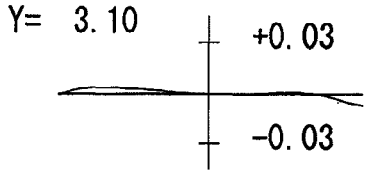
Figure 3D:
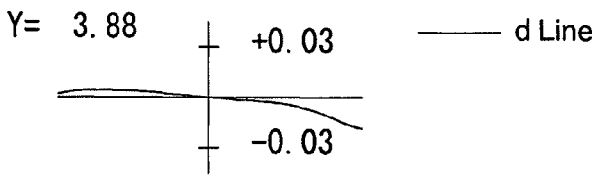
Figure 4:
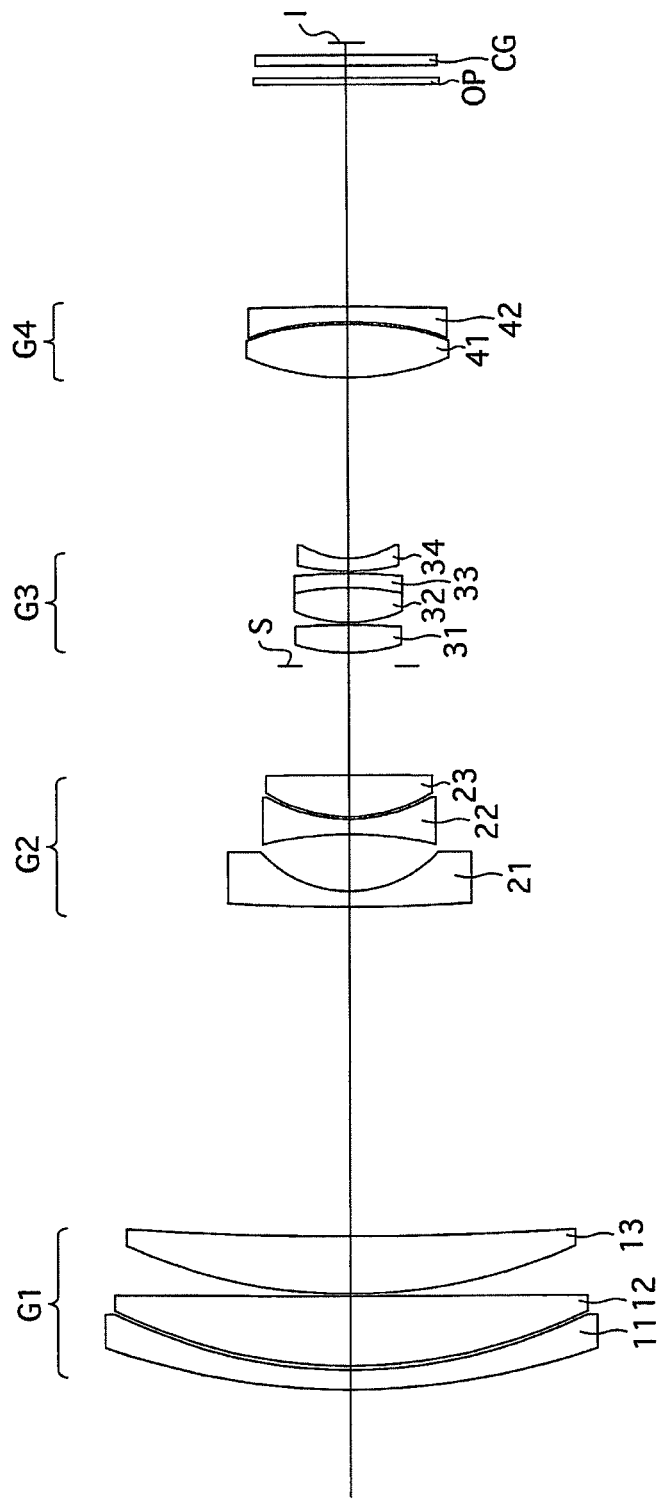
FIG. 4 shows the lens arrangement of the first numerical embodiment at an intermediate focal length when focused on an object at infinity.

FIGS. 1 through 9D and Tables 1 through 4 show a first numerical embodiment of the high zoom-ratio zoom lens system according to the present invention. FIG. 1 shows a lens arrangement of the first numerical embodiment of the high zoom-ratio zoom lens system at the long focal length extremity when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. FIG. 4 shows a lens arrangement of the first numerical embodiment at an intermediate focal length when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. FIG. 7 shows a lens arrangement of the first numerical embodiment at the short focal length extremity when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. Table 1 shows the lens surface data, Table 2 shows various lens system data, Table 3 shows the aspherical surface data, and Table 4 shows the lens group data.

The high zoom-ratio zoom lens system according to the first numerical embodiment is configured of a positive first lens group G1, a negative second lens group G2, a positive third lens group G3, and a positive fourth lens group G4, in that order from the object side. The fourth lens group G4 constitutes a focusing lens group which is moved along the optical axis during a focusing operation (the fourth lens group G4 is advanced toward the object side when focusing on an object at infinity through to an object at a finite distance).

The first lens group G1 (surface Nos. 1 through 6) is configured of a negative meniscus lens element 11 having a convex surface on the object side, a positive meniscus lens element 12 having a convex surface on the object side, and a positive meniscus lens element 13 having a convex surface on the object side, in that order from the object side.

The second lens group G2 (surface Nos. 7 through 12) is configured of a negative meniscus lens element 21 having a convex surface on the object side, a biconcave negative lens element 22, and a biconvex positive lens element 23, in that order from the object side. The biconvex positive lens element 23 has an aspherical surface on each side thereof.

The third lens group G3 (surface Nos. 14 through 20) is configured of a biconvex positive lens element 31, a cemented lens provided with a biconvex positive lens element 32 and a negative meniscus lens element 33 having a convex surface on the image side; and a negative meniscus lens element 34 having a convex surface on the object side, in that order from the object side. The biconvex positive lens element 31 has an aspherical surface on each side thereof. The diaphragm S (surface No. 13) which is positioned in between the second lens group G2 and the third lens group G3 moves integrally with the third lens group G3 along the optical axis direction.

The fourth lens group G4 (surface Nos. 21 through 24) is configured of a biconvex positive lens element 41 and a negative meniscus lens element 42 having a convex surface on the image side, in that order from the object side. The biconvex positive lens element 41 has an aspherical surface on each side thereof. The negative meniscus lens element 42 has an aspherical surface on the object side thereof. An optical filter OP (surface Nos. 25 and 26) and a cover glass CG (surface Nos. 27 and 28) are provided behind (and in front of the imaging plane I) the fourth lens group G4 (the negative meniscus lens element 42).

TABLE 1

SURFACE DATA

| Surf. No. | r | d | N(d) | vd |
|---|---|---|---|---|
| 1 | 34.605 | 0.900 | 2.00100 | 29.1 |
| 2 | 24.193 | 0.200 | | |
| 3 | 24.577 | 3.300 | 1.43500 | 95.0 |
| 4 | 1738.451 | 0.100 | | |
| 5 | 25.784 | 2.650 | 1.59282 | 68.6 |
| 6 | 173.956 | d6 | | |
| 7 | 98.562 | 0.700 | 1.88300 | 40.8 |
| 8 | 5.650 | 2.600 | | |
| 9 | −18.251 | 0.700 | 1.72916 | 54.7 |
| 10 | 7.819 | 0.100 | | |
| 11 * | 7.231 | 1.920 | 1.82115 | 24.1 |
| 12 * | −1000.000 | d12 | | |
| 13(Diaphragm) | ∞ | 0.600 | | |
| 14 * | 8.257 | 1.280 | 1.59201 | 67.0 |
| 15 * | −33.929 | 0.100 | | |
| 16 | 6.125 | 1.600 | 1.48749 | 70.4 |
| 17 | −12.378 | 0.650 | 1.90366 | 31.3 |
| 18 | −26.434 | 0.100 | | |
| 19 | 10.270 | 0.600 | 1.91082 | 35.2 |
| 20 | 4.195 | d20 | | |
| 21 * | 12.255 | 2.460 | 1.54358 | 55.7 |
| 22 * | −13.877 | 0.100 | | |
| 23 * | −13.628 | 0.700 | 1.60641 | 27.2 |
| 24 | −145.412 | d24 | | |
| 25 | ∞ | 0.300 | 1.51680 | 64.2 |
| 26 | ∞ | 0.560 | | |
| 27 | ∞ | 0.500 | 1.51680 | 64.2 |
| 28 | ∞ | — | | |

The asterisk (*) designates an aspherical surface which is rotationally symmetrical with respect to the optical axis.

TABLE 2

ZOOM LENS SYSTEM DATA
Zoom Ratio 18.00

| | Short Focal Length Extremity | Intermediate Focal Length | Long Focal Length Extremity |
|---|---|---|---|
| FNO. | 3.6 | 5.0 | 6.0 |
| f | 4.50 | 19.00 | 81.00 |
| W | 44.2 | 11.5 | 2.7 |
| Y | 3.70 | 3.88 | 3.88 |
| fB | 0.59 | 0.59 | 0.59 |
| L | 49.00 | 61.93 | 72.63 |
| d6 | 0.400 | 15.124 | 27.439 |
| d12 | 15.920 | 5.014 | 0.997 |
| d20 | 5.563 | 8.308 | 18.858 |
| d24 | 3.807 | 10.171 | 2.024 |

TABLE 3

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.7322E−04 | −0.1316E−04 | 0.7020E−06 | −0.1332E−07 |
| 12 | 0.000 | −0.4612E−05 | −0.3441E−05 | 0.3197E−06 | |
| 14 | −1.000 | −0.1129E−03 | 0.6733E−05 | 0.2654E−06 | −0.1777E−06 |
| 15 | 0.000 | 0.3024E−04 | 0.1825E−04 | −0.2052E−05 | |
| 21 | 0.000 | −0.1686E−03 | 0.3030E−04 | −0.2347E−05 | 0.5855E−07 |
| 22 | 0.000 | 0.2038E−02 | −0.1498E−03 | 0.1536E−05 | 0.5729E−07 |
| 23 | 0.000 | 0.1995E−02 | −0.1602E−03 | 0.3426E−05 | |

TABLE 4

LENS GROUP DATA

| Lens Group | 1$^{st}$ Surf. | Focal Length |
|---|---|---|
| 1 | 1 | 40.60 |
| 2 | 7 | −5.99 |
| 3 | 14 | 11.48 |
| 4 | 21 | 22.97 |

Numerical Embodiment 2

Figure 10:
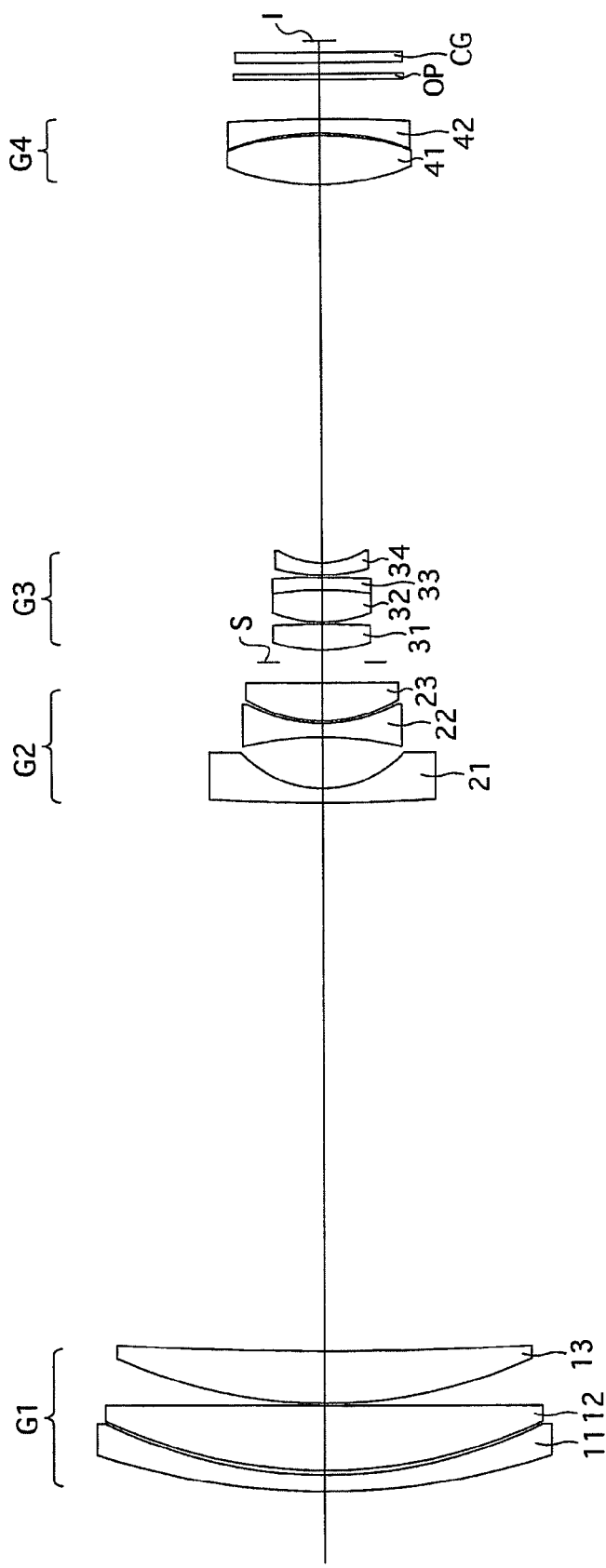
FIG. 10 shows a lens arrangement of a second numerical embodiment of a high zoom-ratio zoom lens system, according to the present invention, at the long focal length extremity when focused on an object at infinity.
Figure 13:
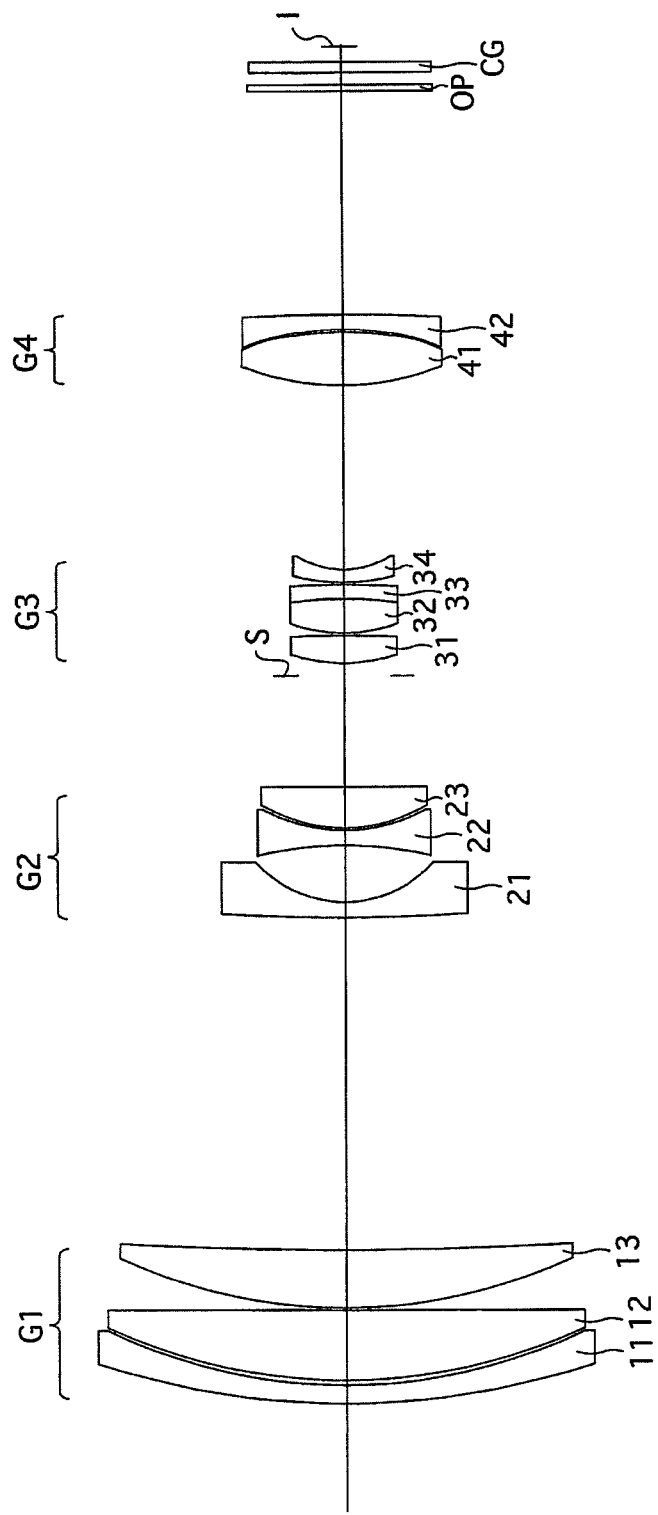
FIG. 13 shows the lens arrangement of the second numerical embodiment at an intermediate focal length when focused on an object at infinity.
Figure 16:
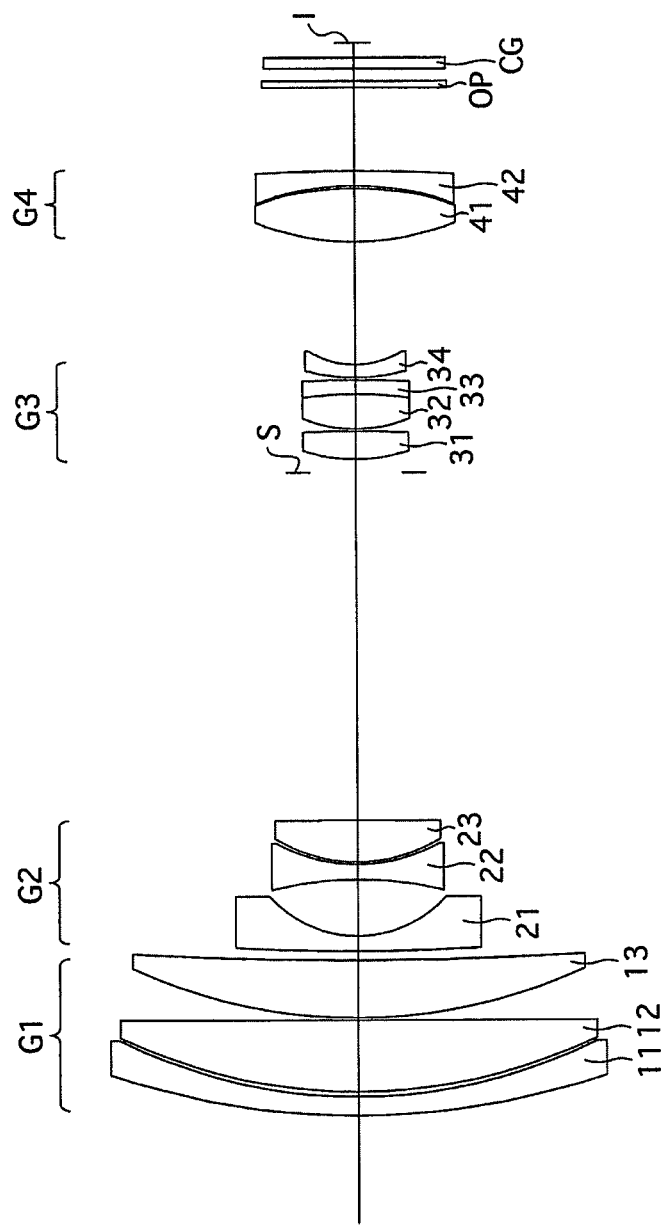
FIG. 16 shows the lens arrangement of the second numerical embodiment at the short focal length extremity when focused on an object at infinity.

FIGS. 10 through 18D and Tables 5 through 8 show a second numerical embodiment of the high zoom-ratio zoom lens system according to the present invention. FIG. 10 shows a lens arrangement of the second numerical embodiment of the high zoom-ratio zoom lens system at the long focal length extremity when focused on an object at infinity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. FIG. 13 shows the lens arrangement of the second numerical embodiment at an intermediate focal length when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. FIG. 16 shows the lens arrangement of the second numerical embodiment at the short focal length extremity when focused on an object at infinity. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 5 shows the lens surface data, Table 6 shows various lens system data, Table 7 shows the aspherical surface data, and Table 8 shows the lens group data.

The lens arrangement of the second numerical embodiment is the same as that of the first numerical embodiment except for the positive lens element 12 of the first lens group G1 being a biconvex positive lens element.

TABLE 5

SURFACE DATA

| Surf. No. | r | d | N(d) | vd |
|---|---|---|---|---|
| 1 | 36.718 | 0.850 | 2.00100 | 29.1 |
| 2 | 25.114 | 0.229 | | |
| 3 | 25.925 | 3.300 | 1.43500 | 95.0 |
| 4 | −6882.285 | 0.100 | | |
| 5 | 25.493 | 2.650 | 1.59282 | 68.6 |

TABLE 5-continued

SURFACE DATA

| Surf. No. | r | d | N(d) | vd |
|---|---|---|---|---|
| 6 | 199.262 | d6 | | |
| 7 | 97.320 | 0.700 | 1.83481 | 42.7 |
| 8 | 5.594 | 2.600 | | |
| 9 | −17.397 | 0.700 | 1.75500 | 52.3 |
| 10 | 8.036 | 0.100 | | |
| 11 * | 7.275 | 1.920 | 1.82115 | 24.1 |
| 12 * | −1000.000 | d12 | | |
| 13(Diaphragm) | ∞ | 0.600 | | |
| 14 * | 7.742 | 1.280 | 1.59201 | 67.0 |
| 15 * | −49.584 | 0.100 | | |
| 16 | 6.842 | 1.600 | 1.49700 | 81.6 |
| 17 | −16.810 | 0.650 | 1.90366 | 31.3 |
| 18 | −40.539 | 0.100 | | |
| 19 | 8.943 | 0.600 | 1.91082 | 35.2 |
| 20 | 4.195 | d20 | | |
| 21 * | 12.526 | 2.460 | 1.54358 | 55.7 |
| 22 * | −13.493 | 0.100 | | |
| 23 * | −12.518 | 0.700 | 1.60641 | 27.2 |
| 24 | −81.176 | d24 | | |
| 25 | ∞ | 0.300 | 1.51680 | 64.2 |
| 26 | ∞ | 0.560 | | |
| 27 | ∞ | 0.500 | 1.51680 | 64.2 |
| 28 | ∞ | — | | |

The asterisk (*) designates an aspherical surface which is rotationally symmetrical with respect to the optical axis.

TABLE 6

ZOOM LENS SYSTEM DATA
Zoom Ratio 18.00

| | Short Focal Length Extremity | Intermediate Focal Length | Long Focal Length Extremity |
|---|---|---|---|
| FNO. | 3.6 | 5.0 | 6.0 |
| f | 4.50 | 19.00 | 81.00 |
| W | 44.2 | 11.5 | 2.9 |
| Y | 3.70 | 3.88 | 3.88 |
| fB | 0.59 | 0.59 | 0.59 |
| L | 49.13 | 62.21 | 72.89 |
| d6 | 0.400 | 15.220 | 27.605 |
| d12 | 15.965 | 5.066 | 1.051 |
| d20 | 5.652 | 8.434 | 18.949 |
| d24 | 3.827 | 10.200 | 2.001 |

TABLE 7

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.1256E−03 | −0.1086E−04 | 0.6229E−06 | −0.1204E−07 |
| 12 | 0.000 | −0.2530E−04 | −0.1826E−05 | 0.3070E−06 | |
| 14 | −1.000 | −0.9410E−04 | 0.1106E−04 | −0.1277E−05 | −0.1310E−06 |
| 15 | 0.000 | 0.1956E−04 | 0.1987E−04 | −0.3049E−05 | |
| 21 | 0.000 | −0.1644E−03 | 0.2742E−04 | −0.2153E−05 | 0.5474E−07 |
| 22 | 0.000 | 0.1804E−02 | −0.1278E−03 | 0.8715E−06 | 0.5781E−07 |
| 23 | 0.000 | 0.1804E−02 | −0.1386E−03 | 0.2779E−05 | |

TABLE 8

LENS GROUP DATA

| Lens Group | 1$^{st}$ Surf. | Focal Length |
|---|---|---|
| 1 | 1 | 40.69 |
| 2 | 7 | −5.99 |
| 3 | 14 | 11.48 |
| 4 | 21 | 23.27 |

Numerical Embodiment 3

Figure 19:
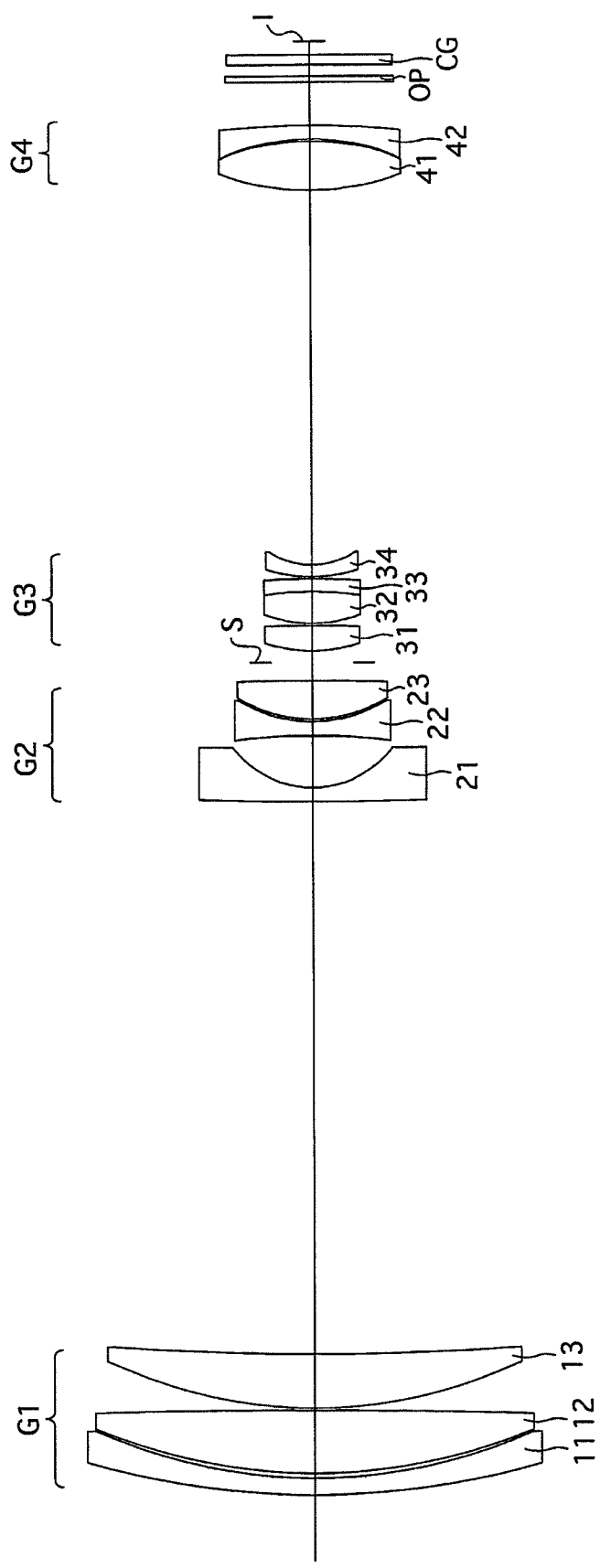
FIG. 19 shows a lens arrangement of a third numerical embodiment of a high zoom-ratio zoom lens system, according to the present invention, at the long focal length extremity when focused on an object at infinity.
Figures 20A, 20B, 20C, 20D:
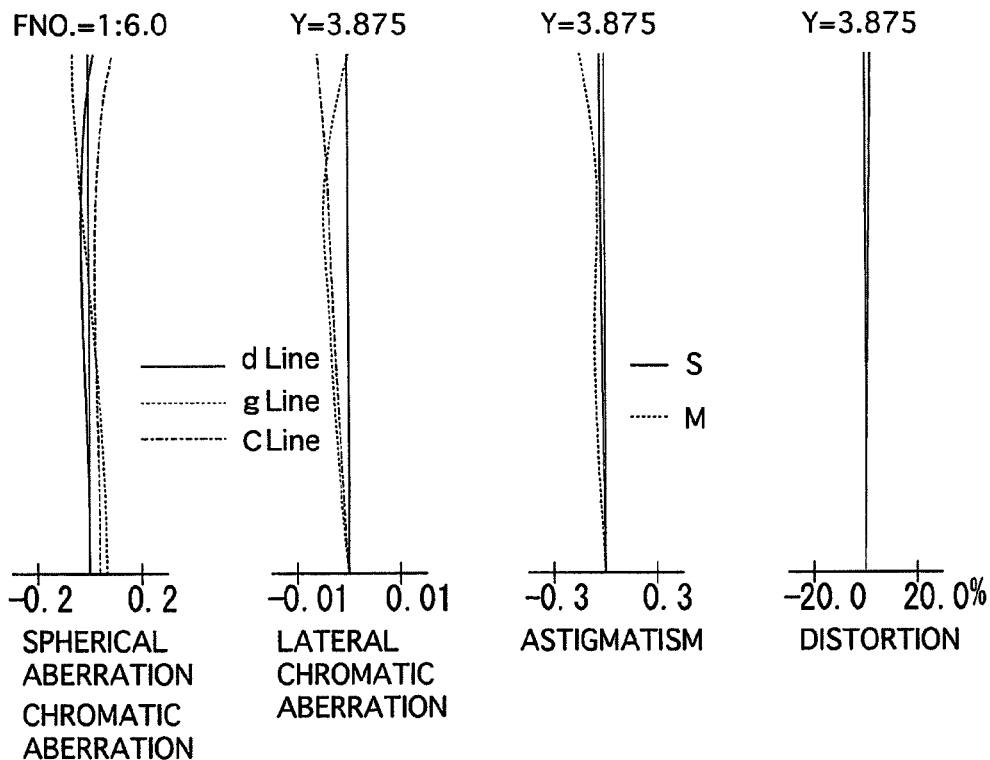
FIGS. 20A, 20B, 20C and 20D show various aberrations that occurred in the lens arrangement shown in FIG. 19.
Figure 21A:
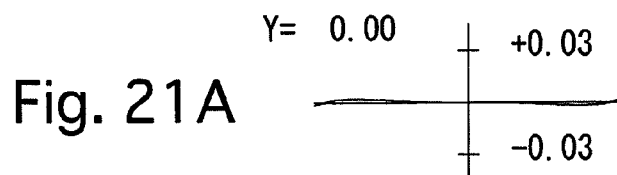
FIGS. 21A, 21B, 21C and 21D show lateral aberrations that occurred in the lens arrangement shown in FIG. 19.
Figure 21B:
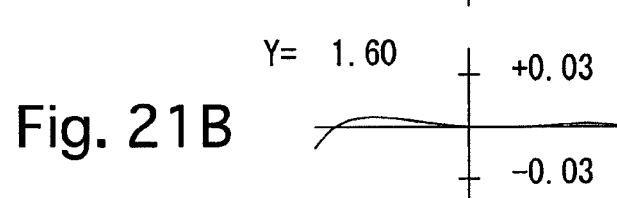
Figure 21C:
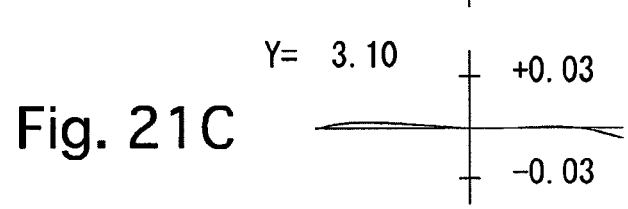
Figure 21D:
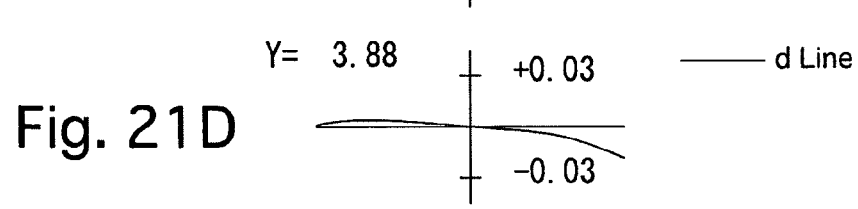
Figure 22:
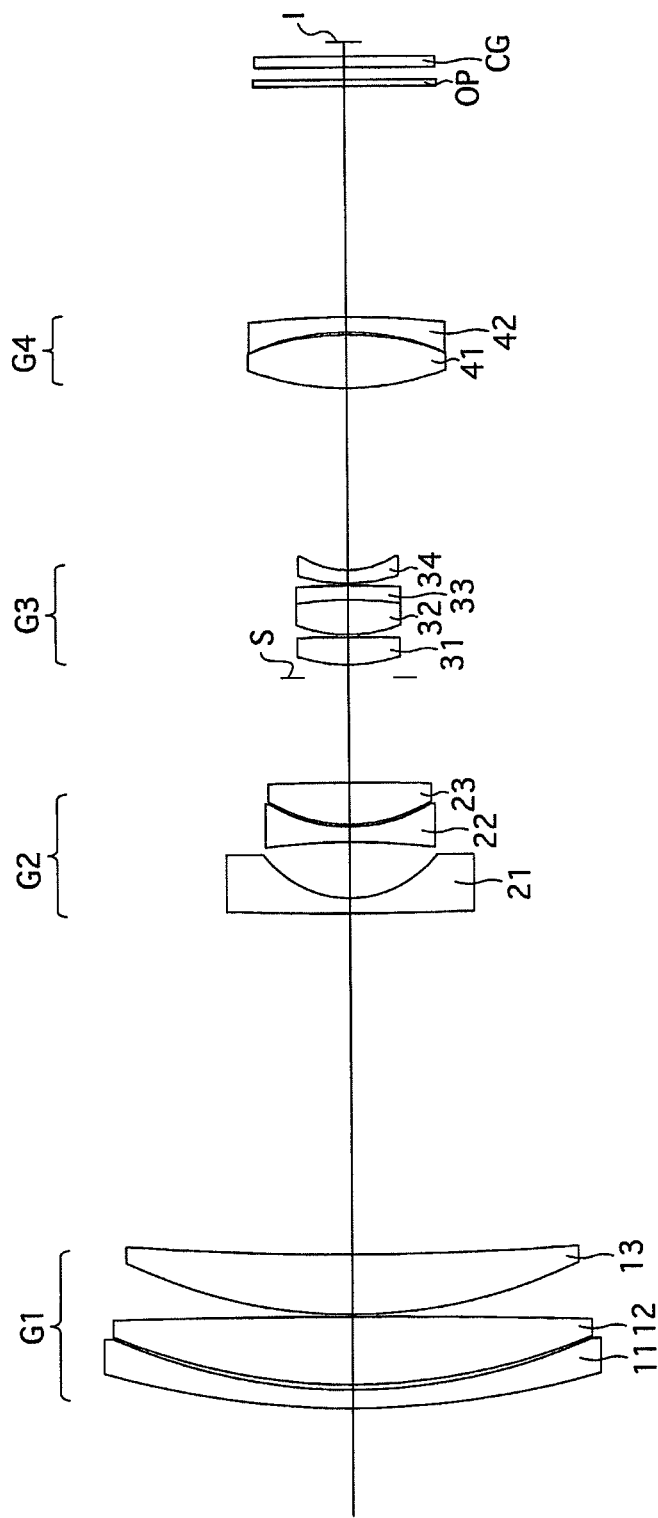
FIG. 22 shows the lens arrangement of the third numerical embodiment at an intermediate focal length when focused on an object at infinity.
Figures 23A, 23B, 23C, 23D:
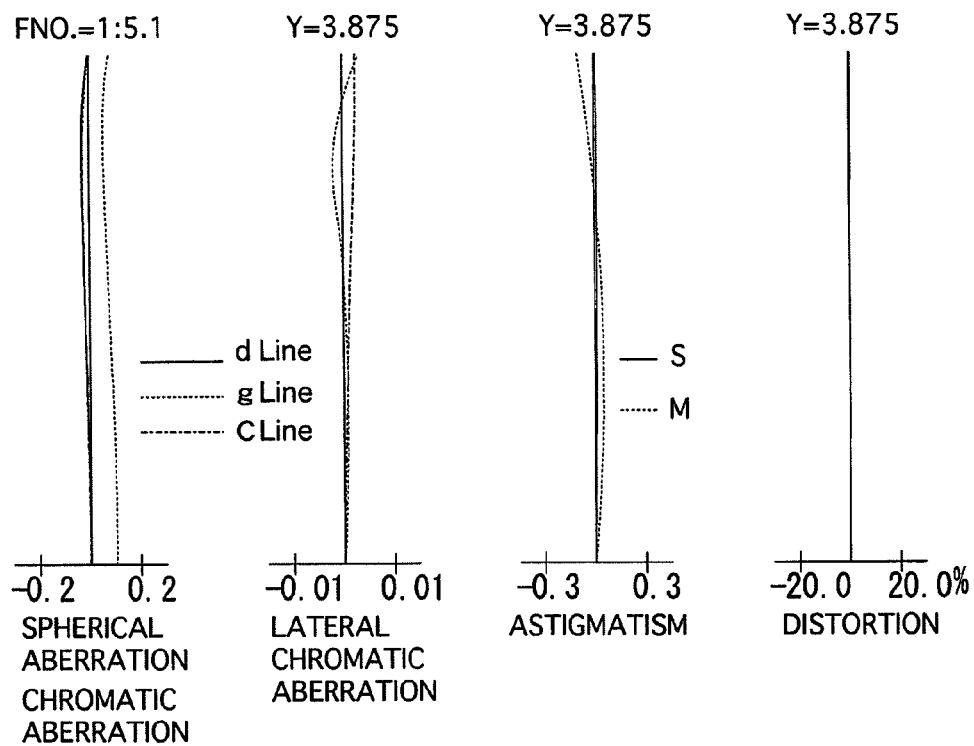
FIGS. 23A, 23B, 23C and 23D show various aberrations that occurred in the lens arrangement shown in FIG. 22.
Figure 24A:
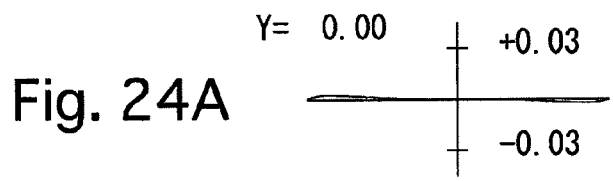
FIGS. 24A, 24B, 24C and 24D show lateral aberrations that occurred in the lens arrangement shown in FIG. 22.
Figure 24B:
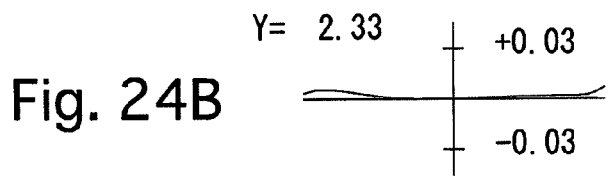
Figure 24C:
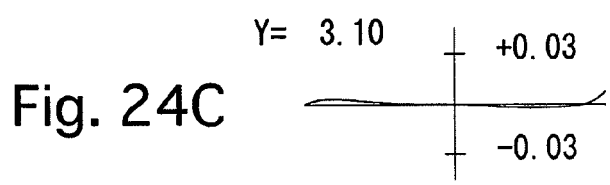
Figure 24D:
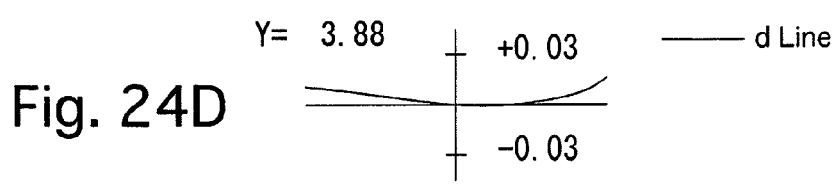
Figure 25:
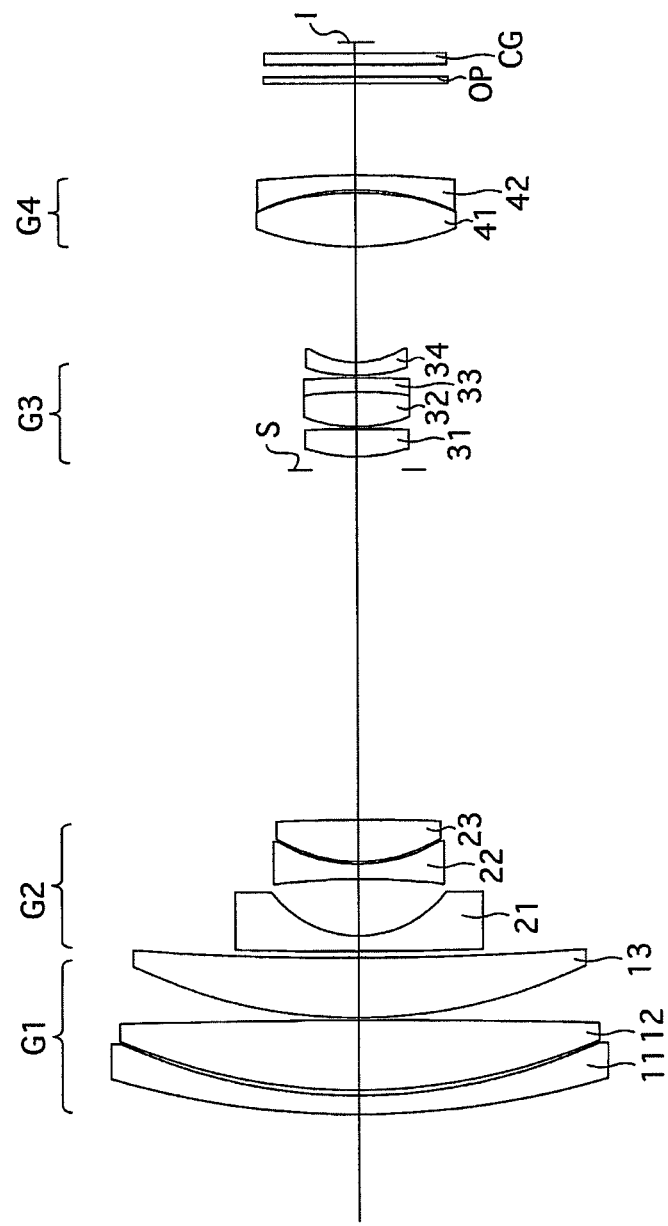
FIG. 25 shows the lens arrangement of the third numerical embodiment at the short focal length extremity when focused on an object at infinity.

FIGS. 19 through 27D and Tables 9 through 12 show a third numerical embodiment of the high zoom-ratio zoom lens system according to the present invention. FIG. 19 shows a lens arrangement of the third numerical embodiment of the high zoom-ratio zoom lens system at the long focal length extremity when focused on an object at infinity. FIGS. 20A, 20B, 20C and 20D show various aberrations that occurred in the lens arrangement shown in FIG. 19. FIGS. 21A, 21B, 21C and 21D show lateral aberrations that occurred in the lens arrangement shown in FIG. 19. FIG. 22 shows the lens arrangement of the third numerical embodiment at an intermediate focal length when focused on an object at infinity. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. FIG. 25 shows the lens arrangement of the third numerical embodiment at the short focal length extremity when focused on an object at infinity. FIGS. 26A, 26B, 26C and 26D show various aberrations that occurred in the lens arrangement shown in FIG. 25. FIGS. 27A, 27B, 27C and 27D show lateral aberrations that occurred in the lens arrangement shown in FIG. 25. Table 9 shows the lens surface data, Table 10 shows various lens system data, Table 11 shows the aspherical surface data, and Table 12 shows the lens group data.

The lens arrangement of the third numerical embodiment is the same as that of the second numerical embodiment.

TABLE 9

SURFACE DATA

| Surf. No. | r | d | N(d) | vd |
|---|---|---|---|---|
| 1 | 41.562 | 0.850 | 2.00100 | 29.1 |
| 2 | 27.073 | 0.250 | | |
| 3 | 28.703 | 3.200 | 1.45860 | 90.2 |
| 4 | −397.212 | 0.100 | | |
| 5 | 24.461 | 2.750 | 1.59282 | 68.6 |
| 6 | 152.531 | d6 | | |
| 7 | 192.680 | 0.700 | 1.83481 | 42.7 |
| 8 | 5.175 | 2.600 | | |
| 9 | −32.628 | 0.700 | 1.75500 | 52.3 |
| 10 | 7.453 | 0.100 | | |
| 11 * | 7.353 | 1.920 | 1.82115 | 24.1 |
| 12 * | −1000.000 | d12 | | |
| 13(Diaphragm) | ∞ | 0.600 | | |
| 14 * | 7.563 | 1.280 | 1.55332 | 71.7 |
| 15 * | −56.223 | 0.100 | | |
| 16 | 6.985 | 1.600 | 1.48749 | 70.4 |
| 17 | −17.726 | 0.650 | 2.00069 | 25.5 |
| 18 | −39.420 | 0.100 | | |
| 19 | 7.924 | 0.600 | 1.91082 | 35.2 |
| 20 | 4.195 | d20 | | |
| 21 * | 13.290 | 2.460 | 1.54358 | 55.7 |
| 22 * | −12.965 | 0.100 | | |
| 23 * | −11.488 | 0.700 | 1.60641 | 27.2 |
| 24 | −46.280 | d24 | | |
| 25 | ∞ | 0.300 | 1.51680 | 64.2 |
| 26 | ∞ | 0.560 | | |
| 27 | ∞ | 0.500 | 1.51680 | 64.2 |
| 28 | ∞ | — | | |

The asterisk (*) designates an aspherical surface which is rotationally symmetrical with respect to the optical axis.

TABLE 10

ZOOM LENS SYSTEM DATA
Zoom Ratio 18.84

| | Short Focal Length Extremity | Intermediate Focal Length | Long Focal Length Extremity |
|---|---|---|---|
| FNO. | 3.6 | 5.1 | 6.0 |
| f | 4.30 | 19.00 | 81.00 |
| W | 45.5 | 11.5 | 2.9 |
| Y | 3.70 | 3.88 | 3.88 |
| fB | 0.59 | 0.59 | 0.59 |
| L | 49.24 | 62.73 | 73.00 |
| d6 | 0.300 | 15.673 | 27.842 |
| d12 | 16.091 | 4.829 | 0.900 |
| d20 | 5.322 | 8.344 | 18.769 |
| d24 | 4.218 | 10.574 | 2.180 |

TABLE 11

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.4412E−04 | −0.3369E−05 | −0.1196E−06 | −0.2525E−08 |
| 12 | 0.000 | −0.1891E−03 | −0.1545E−05 | −0.2660E−06 | |
| 14 | −1.000 | −0.6681E−04 | 0.1573E−04 | −0.2463E−05 | −0.8772E−07 |
| 15 | 0.000 | 0.1404E−04 | 0.2323E−04 | −0.3687E−05 | |
| 21 | 0.000 | −0.1759E−03 | 0.3094E−04 | −0.2478E−05 | 0.6587E−07 |
| 22 | 0.000 | 0.9488E−03 | −0.5478E−04 | −0.1253E−05 | 0.7190E−07 |
| 23 | 0.000 | 0.1048E−02 | −0.7612E−04 | 0.1250E−05 | |

TABLE 12

LENS GROUP DATA

| Lens Group | 1st Surf. | Focal Length |
|---|---|---|
| 1 | 1 | 40.44 |
| 2 | 7 | −5.93 |
| 3 | 14 | 11.67 |
| 4 | 21 | 23.18 |

Numerical Embodiment 4

Figure 28:
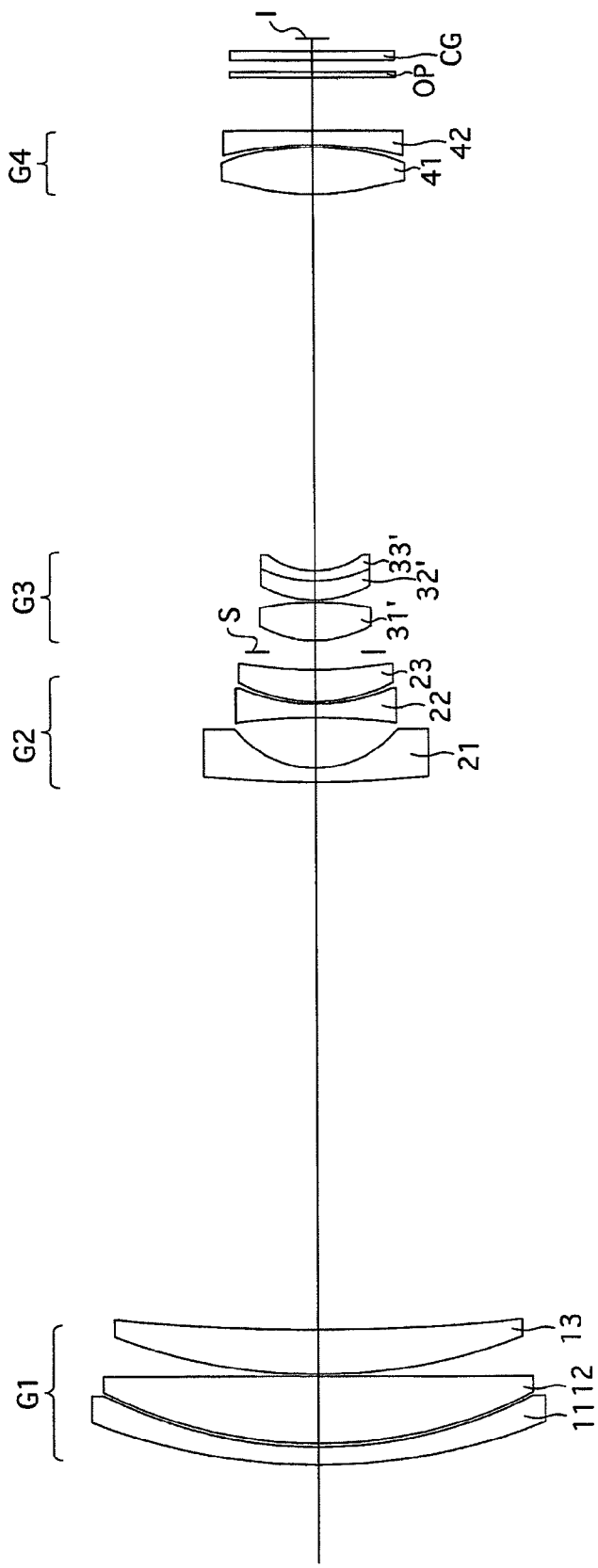
FIG. 28 shows a lens arrangement of a fourth numerical embodiment of a high zoom-ratio zoom lens system, according to the present invention, at the long focal length extremity when focused on an object at infinity.
Figures 29A, 29B, 29C, 29D:
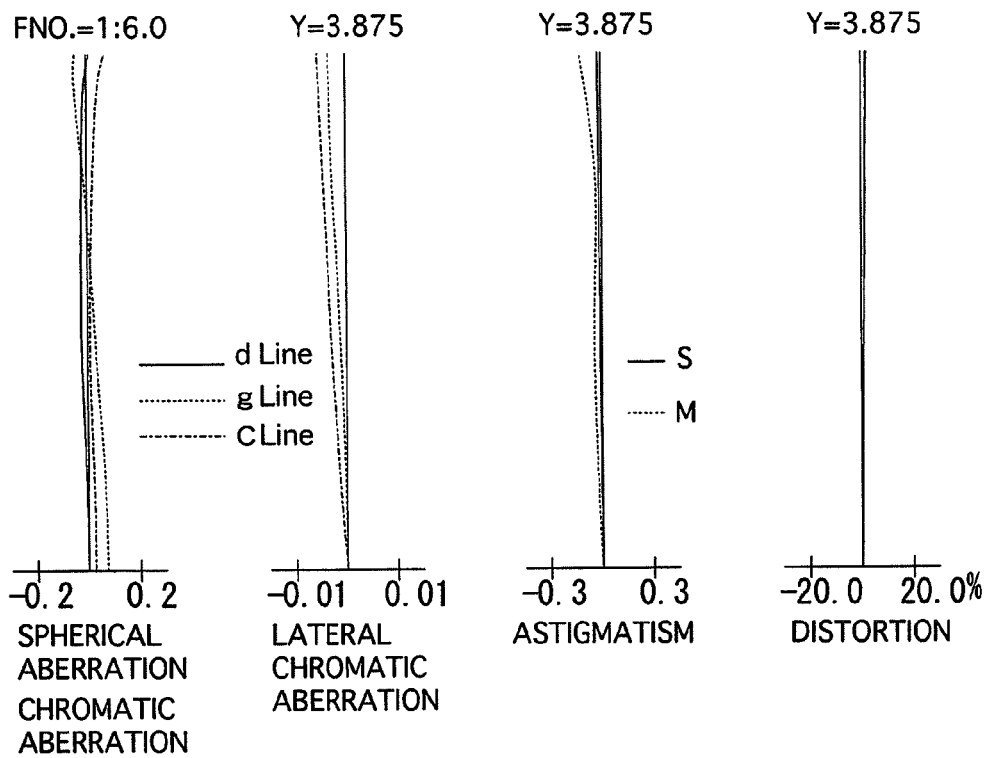
FIGS. 29A, 29B, 29C and 29D show various aberrations that occurred in the lens arrangement shown in FIG. 28.
Figure 30A:
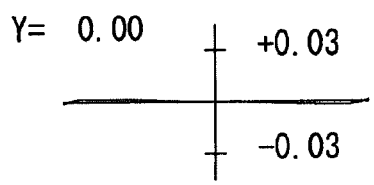
FIGS. 30A, 30B, 30C and 30D show lateral aberrations that occurred in the lens arrangement shown in FIG. 28.
Figure 30B:
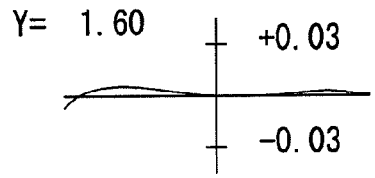
Figure 30C:
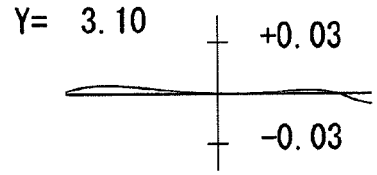
Figure 30D:
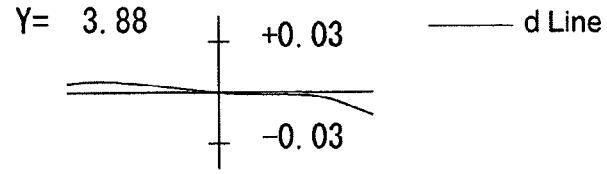
Figure 31:
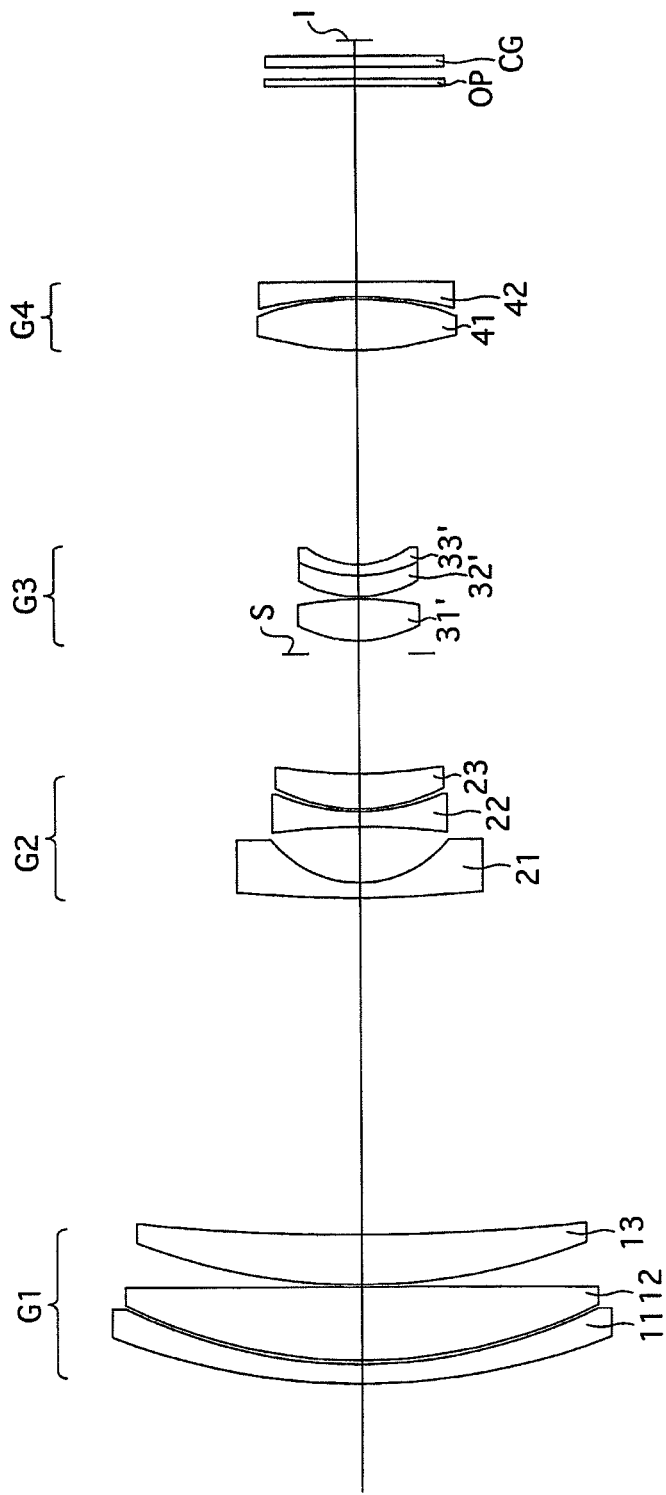
FIG. 31 shows the lens arrangement of the fourth numerical embodiment at an intermediate focal length when focused on an object at infinity.
Figures 32A, 32B, 32C, 32D:
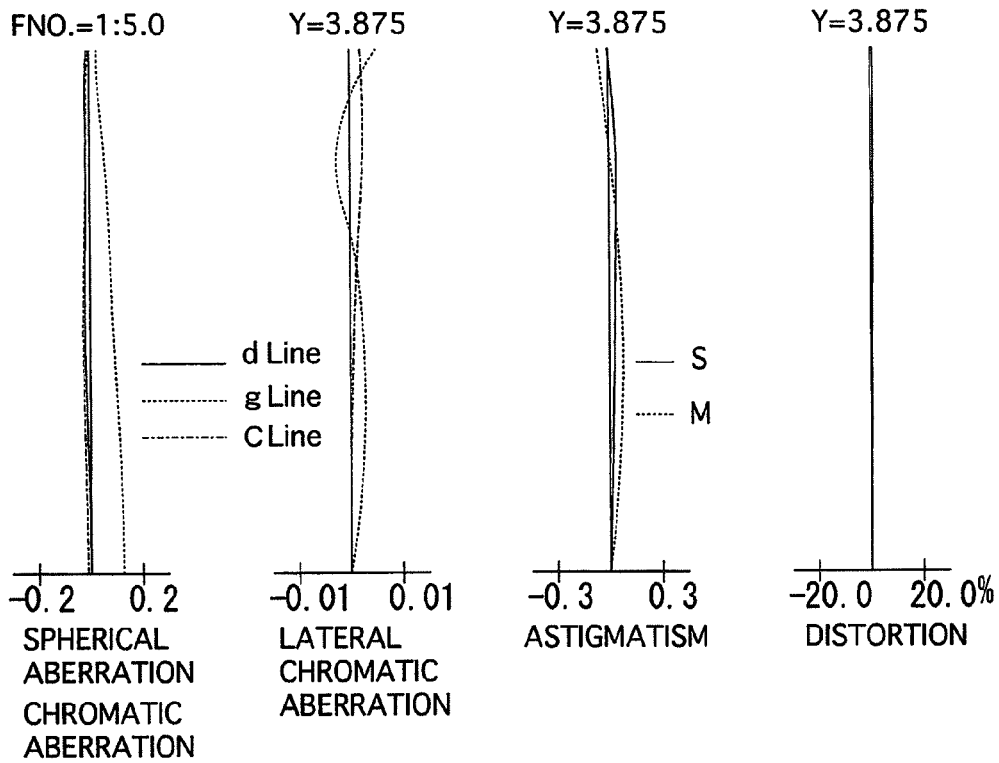
FIGS. 32A, 32B, 32C and 32D show various aberrations that occurred in the lens arrangement shown in FIG. 31.
Figure 33A:
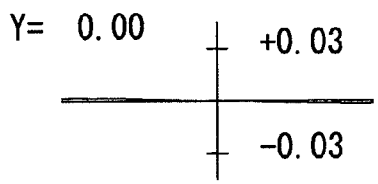
FIGS. 33A, 33B, 33C and 33D show lateral aberrations that occurred in the lens arrangement shown in FIG. 31.
Figure 33B:
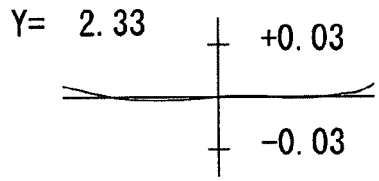
Figure 33C:
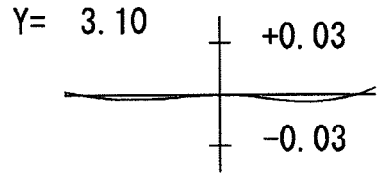
Figure 33D:
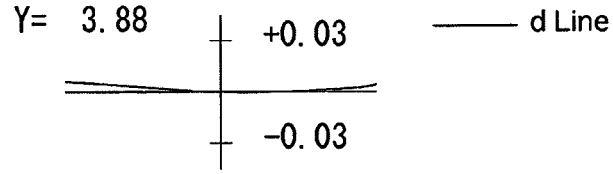
Figure 34:
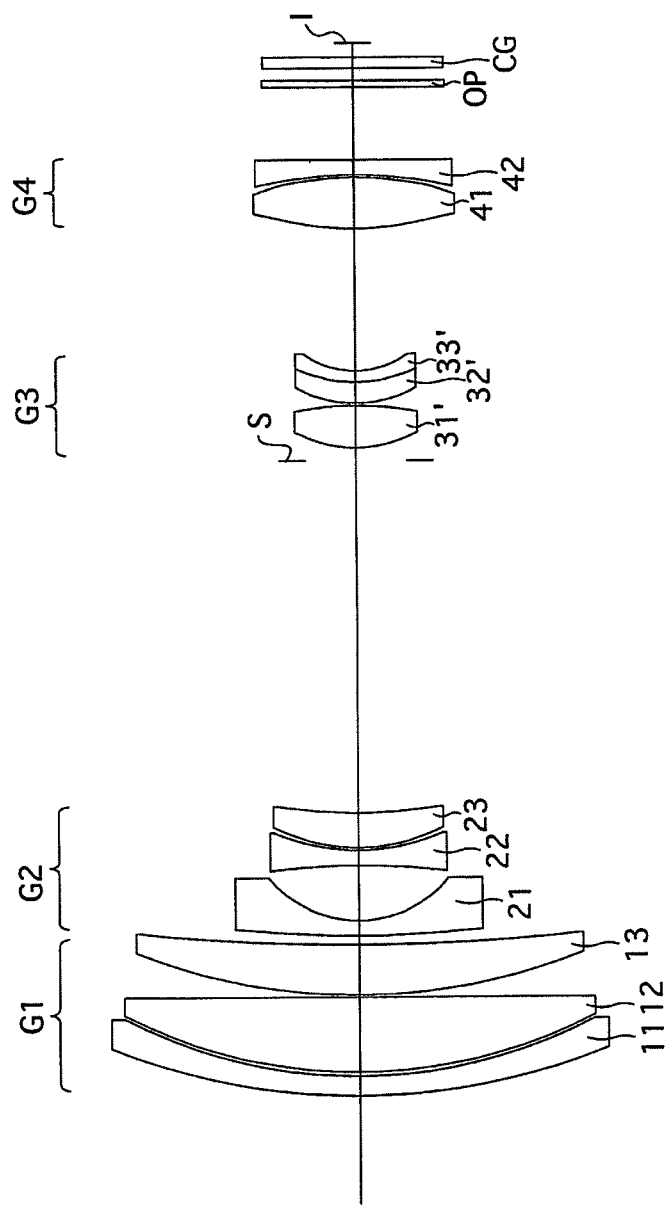
FIG. 34 shows the lens arrangement of the fourth numerical embodiment at the short focal length extremity when focused on an object at infinity.
Figures 35A, 35B, 35C, 35D:
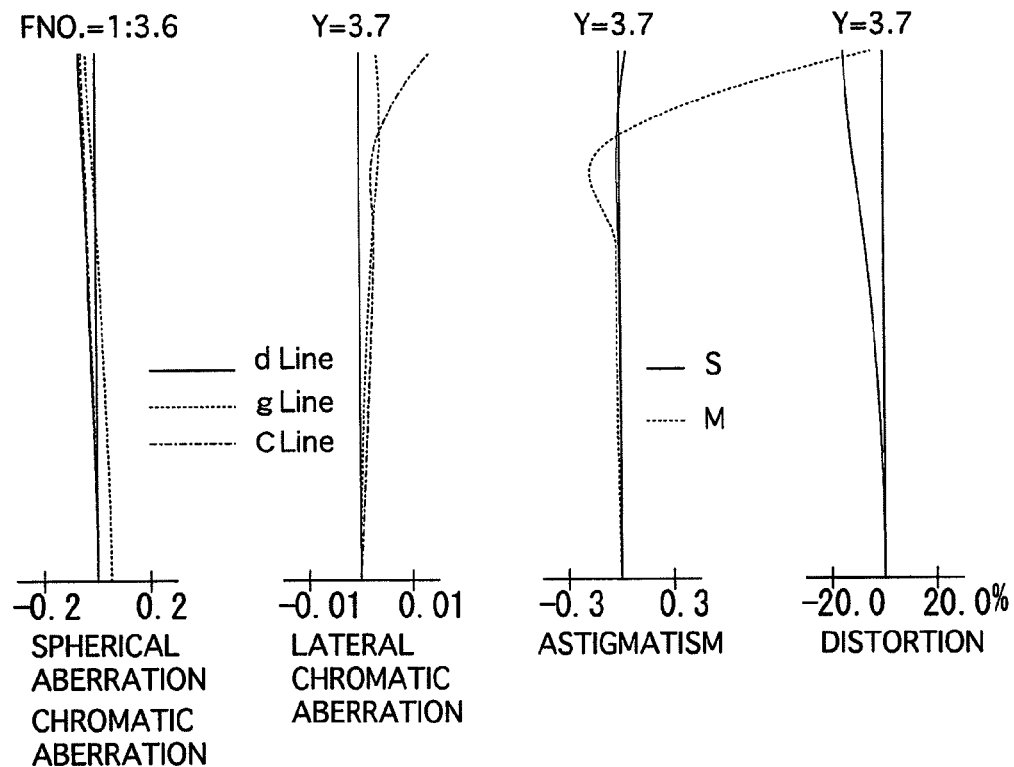
FIGS. 35A, 35B, 35C and 35D show various aberrations that occurred in the lens arrangement shown in FIG. 34.
Figure 36A:
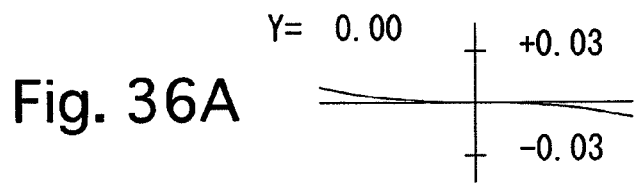
FIGS. 36A, 36B, 36C and 36D show lateral aberrations that occurred in the lens arrangement shown in FIG. 34.
Figure 36B:
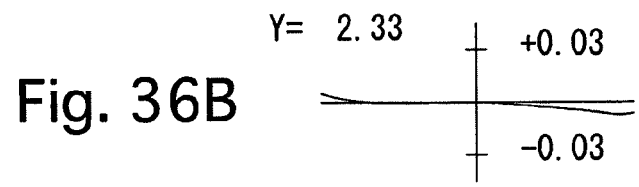
Figure 36C:
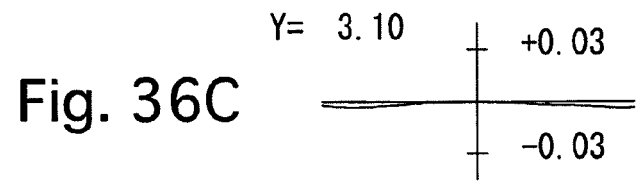
Figure 36D:
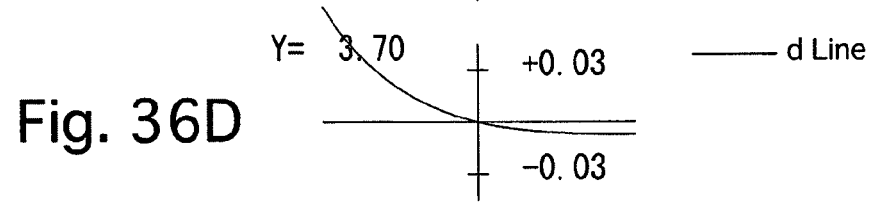

FIGS. 28 through 36D and Tables 13 through 16 show a fourth numerical embodiment of the high zoom-ratio zoom lens system according to the present invention. FIG. 28 shows a lens arrangement of the fourth numerical embodiment of the high zoom-ratio zoom lens system at the long focal length extremity when focused on an object at infinity. FIGS. 29A, 29B, 29C and 29D show various aberrations that occurred in the lens arrangement shown in FIG. 28. FIGS. 30A, 30B, 30C and 30D show lateral aberrations that occurred in the lens arrangement shown in FIG. 28. FIG. 31 shows the lens arrangement of the fourth numerical embodiment at an intermediate focal length when focused on an object at infinity. FIGS. 32A, 32B, 32C and 32D show various aberrations that occurred in the lens arrangement shown in FIG. 31. FIGS. 33A, 33B, 33C and 33D show lateral aberrations that occurred in the lens arrangement shown in FIG. 31. FIG. 34 shows the lens arrangement of the fourth numerical embodiment at the short focal length extremity when focused on an object at infinity. FIGS. 35A, 35B, 35C and 35D show various aberrations that occurred in the lens arrangement shown in FIG. 34. FIGS. 36A, 36B, 36C and 36D show lateral aberrations that occurred in the lens arrangement shown in FIG. 34. Table 13 shows the lens surface data, Table 14 shows various lens system data, Table 15 shows the aspherical surface data, and Table 16 shows the lens group data.

The lens arrangement of the fourth numerical embodiment is the same as those of the second and third numerical embodiments except for the following points:

(1) The negative lens element 21 of the second lens group G2 has an aspherical surface on the object side thereof.

(2) The positive lens element 23 of the second lens group G2 is a positive meniscus lens element having a convex surface on the object side.

(3) The third lens group G3 is configured of a biconvex positive lens element 31', and a cemented lens provided with a positive meniscus lens element 32' having a convex surface on the object side and a negative meniscus lens element 33' having a convex surface on the object side, in that order from the object side. The biconvex positive lens element 31' has an aspherical surface on each side thereof.

TABLE 13

SURFACE DATA

| Surf. No. | r | d | N(d) | vd |
|---|---|---|---|---|
| 1 | 31.385 | 0.900 | 2.00069 | 25.5 |
| 2 | 23.914 | 0.193 | | |
| 3 | 24.169 | 3.449 | 1.45860 | 90.2 |
| 4 | −5256.652 | 0.100 | | |
| 5 | 28.770 | 2.315 | 1.59282 | 68.6 |
| 6 | 100.708 | d6 | | |
| 7* | 49.725 | 0.700 | 1.85135 | 40.1 |
| 8 | 5.397 | 2.544 | | |
| 9 | −33.259 | 0.700 | 1.72916 | 54.7 |
| 10 | 9.886 | 0.100 | | |
| 11* | 7.759 | 1.631 | 2.00272 | 19.3 |
| 12* | 19.234 | d12 | | |
| 13(Diaphragm) | ∞ | 0.600 | | |
| 14* | 5.603 | 1.929 | 1.49700 | 81.6 |
| 15* | −13.345 | 0.100 | | |
| 16 | 5.649 | 0.984 | 1.51680 | 64.2 |
| 17 | 6.760 | 0.500 | 2.00069 | 25.5 |
| 18 | 4.108 | d18 | | |
| 19* | 13.643 | 2.365 | 1.54358 | 55.7 |
| 20* | −11.421 | 0.100 | | |
| 21* | −13.735 | 0.700 | 1.60641 | 27.2 |
| 22 | −751.067 | d22 | | |
| 23 | ∞ | 0.300 | 1.51680 | 64.2 |
| 24 | ∞ | 0.560 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 14

ZOOM LENS SYSTEM DATA
Zoom Ratio 17.79

| | Short Focal Length Extremity | Intermediate Focal Length | Long Focal Length Extremity |
|---|---|---|---|
| FNO. | 3.6 | 5.0 | 6.0 |
| f | 4.55 | 19.00 | 81.01 |
| W | 43.8 | 11.4 | 2.9 |
| Y | 3.70 | 3.88 | 3.88 |
| fB | 0.59 | 0.59 | 0.59 |
| L | 48.30 | 61.60 | 72.05 |
| d6 | 0.406 | 15.463 | 27.615 |
| d12 | 16.172 | 5.461 | 0.900 |
| d18 | 6.521 | 9.821 | 18.997 |
| d22 | 3.343 | 8.994 | 2.675 |

TABLE 15

Aspherical Surface Data (the aspherical surface coefficients not indicated are zero (0.00)):

| Surf. No. | K | A4 | A6 | A8 | A10 |
|---|---|---|---|---|---|
| 7 | 0.000 | 0.5852E−04 | −0.4608E−05 | 0.4828E−07 | |
| 11 | 0.000 | −0.3453E−03 | −0.3329E−04 | 0.2480E−05 | −0.3847E−07 |
| 12 | 0.000 | −0.2434E−03 | −0.3781E−04 | 0.3120E−05 | −0.5900E−07 |
| 14 | −1.000 | −0.3328E−04 | −0.6212E−05 | 0.4129E−05 | −0.3858E−06 |
| 15 | 0.000 | 0.2419E−03 | 0.2412E−04 | −0.1614E−05 | |
| 19 | 0.000 | −0.2825E−03 | 0.4947E−04 | −0.4111E−05 | 0.8523E−07 |
| 20 | 0.000 | 0.2756E−02 | −0.1762E−03 | 0.1763E−05 | 0.6352E−07 |
| 21 | 0.000 | 0.2669E−02 | −0.1955E−03 | 0.4627E−05 | |

TABLE 16

LENS GROUP DATA

| Lens Group | 1$^{st}$ Surf. | Focal Length |
|---|---|---|
| 1 | 1 | 41.83 |
| 2 | 7 | −6.02 |
| 3 | 14 | 11.19 |
| 4 | 19 | 22.63 |

Numerical Embodiment 5

Figure 37:
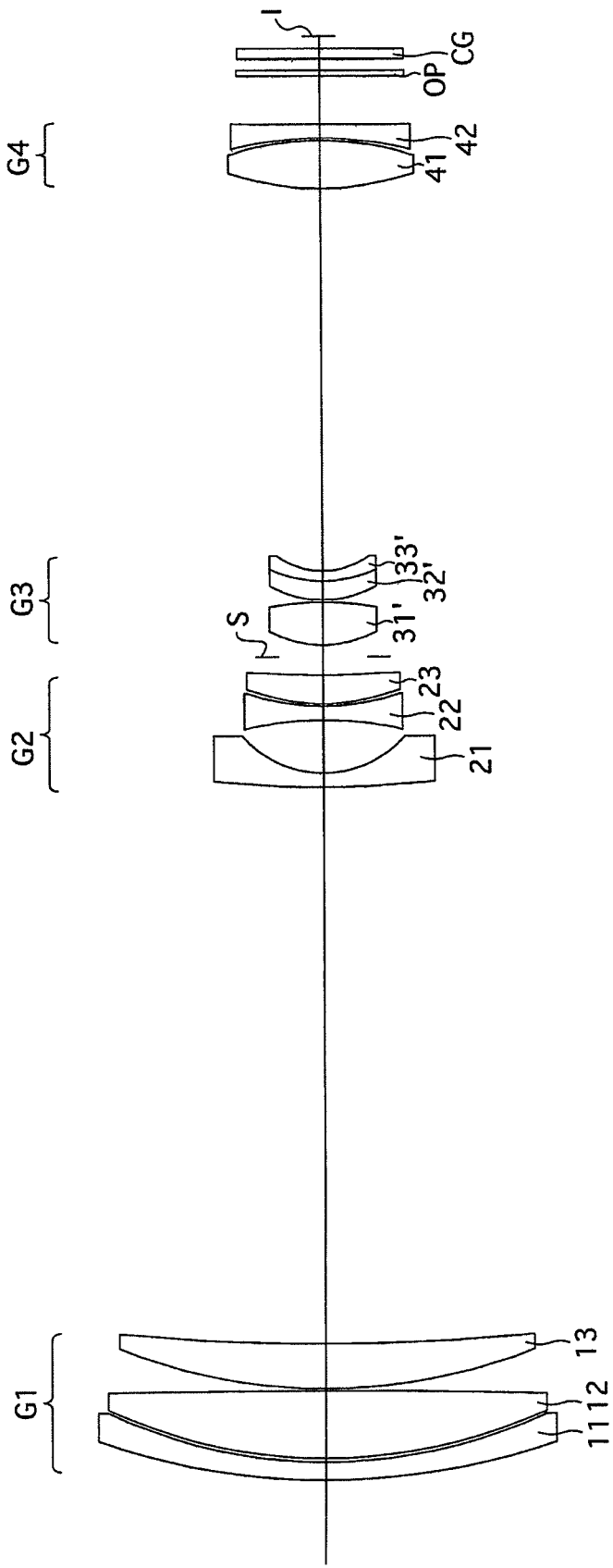
FIG. 37 shows a lens arrangement of a fifth numerical embodiment of a high zoom-ratio zoom lens system, according to the present invention, at the long focal length extremity when focused on an object at infinity.
Figure 40:
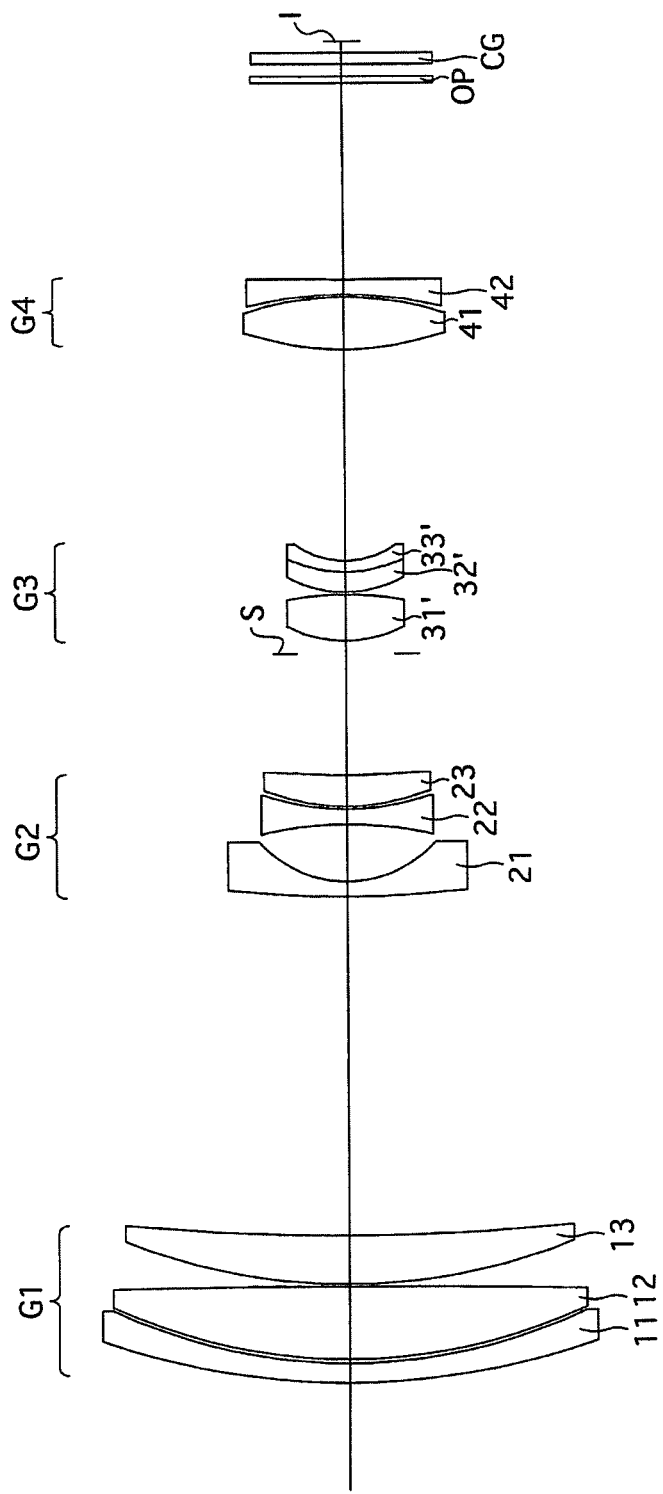
FIG. 40 shows the lens arrangement of the fifth numerical embodiment at an intermediate focal length when focused on an object at infinity.
Figure 43:
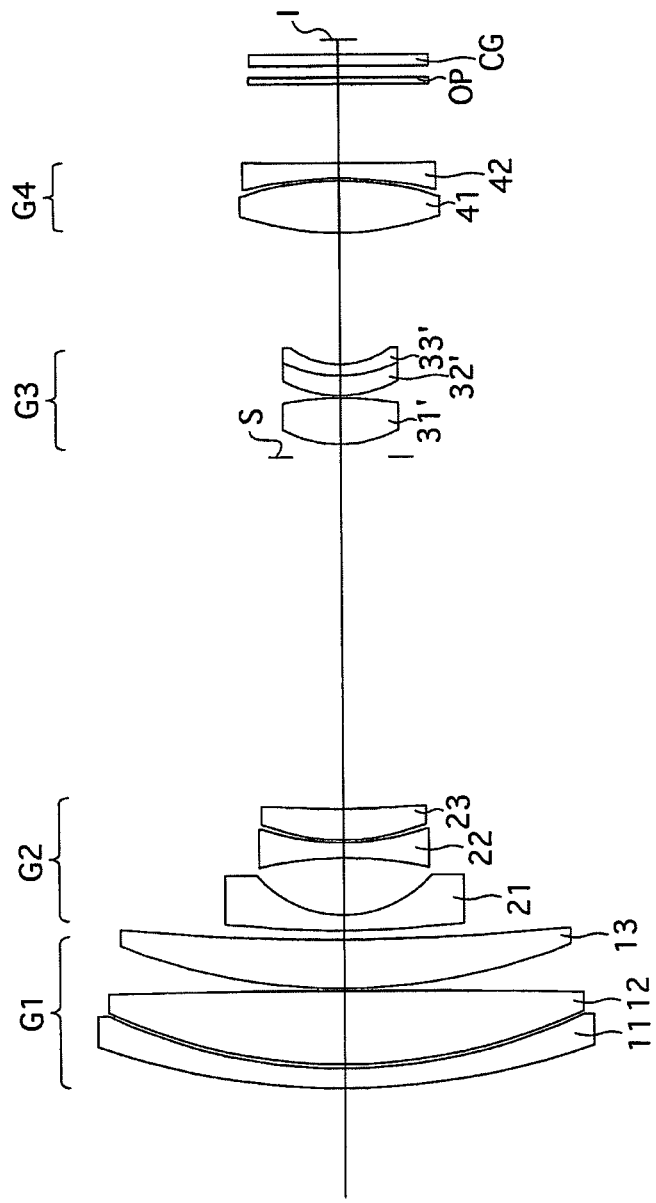
FIG. 43 shows the lens arrangement of the fifth numerical embodiment at the short focal length extremity when focused on an object at infinity.

FIGS. 37 through 45D and Tables 17 through 20 show a fifth numerical embodiment of the high zoom-ratio zoom lens system according to the present invention. FIG. 37 shows a lens arrangement of the fifth numerical embodiment of the high zoom-ratio zoom lens system at the long focal length extremity when focused on an object at infinity. FIGS. 38A, 38B, 38C and 38D show various aberrations that occurred in the lens arrangement shown in FIG. 37. FIGS. 39A, 39B, 39C and 39D show lateral aberrations that occurred in the lens arrangement shown in FIG. 37. FIG. 40 shows the lens arrangement of the fifth numerical embodiment at an intermediate focal length when focused on an object at infinity. FIGS. 41A, 41B, 41C and 41D show various aberrations that occurred in the lens arrangement shown in FIG. 40. FIGS. 42A, 42B, 42C and 42D show lateral aberrations that occurred in the lens arrangement shown in FIG. 40. FIG. 43 shows the lens arrangement of the fifth numerical embodiment at the short focal length extremity when focused on an object at infinity. FIGS. 44A, 44B, 44C and 44D show various aberrations that occurred in the lens arrangement shown in FIG. 43. FIGS. 45A, 45B, 45C and 45D show lateral aberrations that occurred in the lens arrangement shown in FIG. 43. Table 17 shows the lens surface data, Table 18 shows various lens system data, Table 19 shows the aspherical surface data, and Table 20 shows the lens group data.

The lens arrangement of the fifth numerical embodiment is the same as that of the fourth numerical embodiment except that the negative lens element 42 of the fourth lens group G4 is a biconcave negative lens element.

TABLE 17

SURFACE DATA

| Surf. No. | r | d | N(d) | vd |
|---|---|---|---|---|
| 1 | 34.694 | 0.900 | 2.00069 | 25.5 |
| 2 | 25.793 | 0.190 | | |
| 3 | 26.182 | 3.385 | 1.45860 | 90.2 |
| 4 | −497.744 | 0.100 | | |

TABLE 17-continued

SURFACE DATA

| Surf. No. | r | d | N(d) | vd |
|---|---|---|---|---|
| 5 | 27.942 | 2.258 | 1.59282 | 68.6 |
| 6 | 104.780 | d6 | | |
| 7 * | 46.389 | 0.700 | 1.85135 | 40.1 |
| 8 | 5.509 | 2.609 | | |
| 9 | −18.124 | 0.700 | 1.75500 | 52.3 |
| 10 | 12.195 | 0.100 | | |
| 11 * | 9.172 | 1.447 | 2.00272 | 19.3 |
| 12 * | 34.882 | d12 | | |
| 13(Diaphragm) | ∞ | 0.600 | | |
| 14 * | 5.498 | 2.130 | 1.49700 | 81.6 |
| 15 * | −14.126 | 0.100 | | |
| 16 | 5.493 | 0.943 | 1.51680 | 64.2 |
| 17 | 6.501 | 0.500 | 2.00069 | 25.5 |
| 18 | 3.992 | d18 | | |
| 19 * | 13.349 | 2.402 | 1.54358 | 55.7 |
| 20 * | −11.443 | 0.100 | | |
| 21 * | −13.724 | 0.700 | 1.60641 | 27.2 |
| 22 | 412.266 | d22 | | |
| 23 | ∞ | 0.300 | 1.51680 | 64.2 |
| 24 | ∞ | 0.560 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 18

ZOOM LENS SYSTEM DATA
Zoom Ratio 17.80

| | Short Focal Length Extremity | Intermediate Focal Length | Long Focal Length Extremity |
|---|---|---|---|
| FNO. | 3.6 | 5.0 | 6.0 |
| f | 4.55 | 19.00 | 81.00 |
| W | 43.9 | 11.4 | 2.9 |
| Y | 3.70 | 3.88 | 3.88 |
| fB | 0.59 | 0.59 | 0.59 |
| L | 47.99 | 61.61 | 71.67 |
| d6 | 0.411 | 15.525 | 27.677 |
| d12 | 16.092 | 5.568 | 0.900 |
| d18 | 6.054 | 9.728 | 18.899 |
| d22 | 3.621 | 8.974 | 2.381 |

TABLE 19

Aspherical Surface Data (the aspherical surface coefficients not indicated are zero (0.00)):

| Surf. No. | K | A4 | A6 | A8 | A10 |
|---|---|---|---|---|---|
| 7 | 0.000 | 0.6047E−04 | −0.3864E−05 | 0.2593E−07 | |
| 11 | 0.000 | −0.2791E−03 | −0.3907E−04 | 0.2124E−05 | −0.3542E−07 |
| 12 | 0.000 | −0.1490E−03 | −0.4416E−04 | 0.2706E−05 | −0.5900E−07 |
| 14 | −1.000 | −0.2402E−05 | 0.6571E−05 | 0.1235E−05 | −0.1932E−06 |
| 15 | 0.000 | 0.2516E−03 | 0.2655E−04 | −0.2084E−05 | |
| 19 | 0.000 | −0.2113E−03 | 0.4600E−04 | −0.3840E−05 | 0.8524E−07 |
| 20 | 0.000 | 0.2789E−02 | −0.1753E−03 | 0.1696E−05 | 0.6986E−07 |
| 21 | 0.000 | 0.2649E−02 | −0.1939E−03 | 0.4541E−05 | |

TABLE 20

LENS GROUP DATA

| Lens Group | 1$^{st}$ Surf. | Focal Length |
|---|---|---|
| 1 | 1 | 41.52 |
| 2 | 7 | −6.07 |
| 3 | 14 | 11.28 |
| 4 | 19 | 23.33 |

The numerical values of each condition for each embodiment are shown in Table 21.

TABLE 21

| | Embod. 1 | Embod. 2 | Embod. 3 |
|---|---|---|---|
| Cond. (1) | 2.00100 | 2.00100 | 2.00100 |
| Cond. (2) | 95.0 | 95.0 | 90.2 |
| Cond. (3) | −0.154 | −0.154 | −0.154 |

| | Embod. 4 | Embod. 5 |
|---|---|---|
| Cond. (1) | 2.00069 | 2.00069 |
| Cond. (2) | 90.2 | 90.2 |
| Cond. (3) | −0.153 | −0.154 |

As can be understood from Table 21, the first through fifth numerical embodiments satisfy conditions (1) through (3). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A high zoom-ratio zoom lens system comprising a positive first lens group, a negative second lens group, a positive third lens group and a positive fourth lens group, in that order from the object side,
wherein upon zooming from the short focal length extremity to the long focal length extremity, at least the first through third lens groups move along the optical axis direction in a manner so that the distance between said first lens group and said second lens group increases, the distance between said second lens group and said third lens group decreases, and the distance between said third lens group and said fourth lens group increases, wherein the amount of movement of said first lens group during zooming is larger than that of said third lens group,
wherein said first lens group includes a negative lens element, a positive lens element, and a positive lens element, in that order from the object side,
wherein the absolute value of the radius of curvature of the surface on the image side of the negative lens element which is provided within said first lens group is smaller than the absolute value of the radius of curvature of the surface on the object side of the positive lens element which is provided on the object side within said first lens group, and
wherein the following condition (1) is satisfied:

$$1.95 < n11 \tag{1},$$

wherein
n11 designates the refractive index at the d-line of the negative lens element which is provided within said first lens group.

2. The high zoom-ratio zoom lens system according to claim 1, wherein the following condition (2) is satisfied:

$$v12 > 90 \tag{2},$$

wherein
v12 designates the Abbe number with respect to the d-line of the positive lens element which is provided on the object side within said first lens group.

3. The high zoom-ratio zoom lens system according to claim 1, wherein the following condition (3) is satisfied:

$$-0.3 < DW < -0.1 \tag{3},$$

wherein
DW designates the distortion at the maximum image height at the short focal length extremity.

4. An electronic imaging apparatus comprising:
the high zoom-ratio zoom lens system according to claim 3; and
an electronic imaging sensor, onto which an image is formed via said high zoom-ratio zoom lens system,
wherein distortion is corrected by image-processing image data which is photoelectrically converted by said electronic imaging sensor.

5. A method of reducing a frontmost lens diameter of the high zoom-ratio zoom lens system according to claim 1, which is installed in an electronic imaging apparatus, wherein said electronic imaging apparatus includes an electronic imaging sensor onto which an image is formed via said high zoom-ratio zoom lens system, comprising:
arranging said high zoom-ratio zoom lens system so as to allow distortion to occur therein; and
correcting said distortion by image-processing image data which is photoelectrically converted by said electronic imaging sensor,
wherein the following condition (3) is satisfied:

$$-0.3 < DW < -0.1 \tag{3},$$

wherein
DW designates said distortion at the maximum image height at the short focal length extremity.

* * * * *